United States Patent
Suzuki et al.

(10) Patent No.: US 8,795,619 B2
(45) Date of Patent: Aug. 5, 2014

(54) CATALYST FOR PURIFICATION OF EXHAUST GAS, AND APPARATUS AND METHOD FOR PURIFICATION OF EXHAUST GAS USING THE CATALYST

(75) Inventors: Tadashi Suzuki, Seto (JP); Satoru Kato, Nagoya (JP); Naoki Takahashi, Nagoya (JP); Takaaki Kanazawa, Toyota (JP); Masanori Yamato, Toyota (JP); Kazuhiro Yoshimoto, Ooita (JP); Michihiko Takeuchi, Kakegawa (JP); Yuuji Matsuhisa, Kakegawa (JP)

(73) Assignees: Toyota Jidosha Kabushiki Kaisha, Toyota-shi, Aichi (JP); Cataler Corporation, Kakegawa-shi, Shizuoka (JP)

( * ) Notice: Subject to any disclaimer, the term of this patent is extended or adjusted under 35 U.S.C. 154(b) by 1246 days.

(21) Appl. No.: 12/599,057

(22) PCT Filed: May 8, 2008

(86) PCT No.: PCT/JP2008/058580
§ 371 (c)(1),
(2), (4) Date: Sep. 17, 2010

(87) PCT Pub. No.: WO2008/140025
PCT Pub. Date: Nov. 20, 2008

(65) Prior Publication Data
US 2011/0014101 A1  Jan. 20, 2011

(30) Foreign Application Priority Data

May 8, 2007 (JP) .................. 2007-123036

(51) Int. Cl.
| | |
|---|---|
| B01D 50/00 | (2006.01) |
| B01D 53/34 | (2006.01) |
| B01D 53/04 | (2006.01) |
| B01D 53/56 | (2006.01) |
| C01B 17/16 | (2006.01) |
| C01B 31/20 | (2006.01) |
| B01J 27/00 | (2006.01) |
| B01J 27/185 | (2006.01) |
| B01J 21/00 | (2006.01) |
| B01J 21/04 | (2006.01) |
| B01J 25/00 | (2006.01) |
| B01J 23/00 | (2006.01) |
| B01J 23/02 | (2006.01) |
| B01J 23/04 | (2006.01) |
| B01J 23/08 | (2006.01) |
| B01J 23/40 | (2006.01) |
| B01J 23/42 | (2006.01) |
| B01J 23/44 | (2006.01) |
| B01J 23/56 | (2006.01) |
| B01J 23/58 | (2006.01) |
| B01J 20/00 | (2006.01) |

(52) U.S. Cl.
USPC .......... 423/230; 502/208; 502/213; 502/243; 502/261; 502/262; 502/263; 502/313; 502/317; 502/326; 502/327; 502/330; 502/332; 502/333; 502/334; 502/339; 502/344; 502/349; 502/350; 502/351; 502/355; 502/415; 502/439; 422/177

(58) Field of Classification Search
USPC ......... 502/339, 355, 415, 439, 208, 213, 243, 502/261–263, 343, 317, 326–327, 330, 502/332–334, 344, 349–351
See application file for complete search history.

(56) References Cited

U.S. PATENT DOCUMENTS 3,444,256 A * 5/1969 Engelhard et al. ............ 585/259
4,849,398 A * 7/1989 Takada et al. ................. 502/303

(Continued)

FOREIGN PATENT DOCUMENTS

| EP | 0 983 787 A3 | 10/2001 |
| JP | 63-158129 | 7/1988 |

(Continued)

OTHER PUBLICATIONS

Yamada, T. et al., "Development of Non-Ni Low $H_2S$ Pt/Rh/$CeO_2$ TWC Catalyst," SAE Technical Papers Series, SAE Paper No. 900611 (1990).
Translation of the International Preliminary Report on Patentability, dated Dec. 3, 2009, for PCT/JP2008/058580.

Primary Examiner — Cam N. Nguyen
(74) Attorney, Agent, or Firm — Finnegan, Henderson, Farabow, Garrett & Dunner, LLP

(57) ABSTRACT

A catalyst for purification of exhaust gas, in which a noble metal is supported on a metal oxide support, has a basic site content of 1 mmol/L-cat or less, as determined on the basis of an amount of $CO_2$ desorbed per liter of the catalyst as measured by a $CO_2$ temperature-programmed desorption method.

10 Claims, 11 Drawing Sheets

(56) References Cited

U.S. PATENT DOCUMENTS

| | | | |
|---|---|---|---|
| 6,090,744 A * | 7/2000 | Koda et al. | 502/304 |
| 6,497,848 B1 * | 12/2002 | Deeba et al. | 422/180 |
| 7,081,430 B2 * | 7/2006 | Uenishi et al. | 502/327 |
| 7,220,702 B2 * | 5/2007 | Hara et al. | 502/327 |
| 7,229,947 B2 * | 6/2007 | Hara et al. | 502/327 |
| 7,294,604 B2 * | 11/2007 | Dath et al. | 502/250 |
| 7,741,499 B2 * | 6/2010 | Lockemeyer | 549/534 |
| 2009/0082199 A1 | 3/2009 | Suzuki et al. | |

FOREIGN PATENT DOCUMENTS

| | | |
|---|---|---|
| JP | 2000-70722 | 3/2000 |
| JP | 2000-126594 | 5/2000 |
| JP | 2002-311013 | 10/2002 |
| JP | 2003-305363 | 10/2003 |
| JP | 2004-167354 | 6/2004 |
| JP | 2005-81183 | 3/2005 |
| JP | 2006-326495 | 12/2006 |

* cited by examiner

CATALYST FOR PURIFICATION OF EXHAUST GAS, AND APPARATUS AND METHOD FOR PURIFICATION OF EXHAUST GAS USING THE CATALYST

CROSS-REFERENCE TO RELATED APPLICATIONS

This application is a national phase application of International Application No. PCT/JP2008/058580, filed May 8, 2008, and claims the priority of Japanese Application No. 2007-123036, filed May 8, 2007, the contents of both of which are incorporated herein by reference.

TECHNICAL FIELD

The present invention relates to a catalyst for purification of exhaust gas, an apparatus for purification of exhaust gas using the catalyst, and a method for purification of exhaust gas using the catalyst.

BACKGROUND OF THE INVENTION

Catalysts for purification of exhaust gas have been conventionally used for removing harmful components such as hydrocarbon gas (HC), carbon monoxide (CO) and nitrogen oxides ($NO_x$) in exhaust gas from automotive engines. As such catalysts for purification of exhaust gas, there are known three-way catalysts capable of simultaneously cleaning HC, CO and $NO_x$ in exhaust gas combusted in the theoretical air-fuel ratio. Such a three-way catalyst has a nature of storing sulfur (S) components contained in exhaust gas in the form of sulfate during the use. Accordingly, when a three-way catalyst is used with a fuel containing a high concentration of sulfur components, the sulfur components are gradually accumulated therein (sulfur poisoning). In the meanwhile, the accumulated sulfur components are desorbed in a reduction atmosphere, and react with hydrogen in the exhaust gas to generate hydrogen sulfide ($H_2S$) which gives an odor ($H_2S$ odor). Hence, studies on three-way catalysts have been conducted to reduce the generation of $H_2S$, and various catalysts have been disclosed.

For example, Japanese Unexamined Patent Application Publication No. 2006-326495 (Document 1) discloses a catalyst for purification of exhaust gas comprising a metal oxide support, a noble metal, and nickel oxide (NiO). Such a catalyst for purification of exhaust gas traps a sulfur component in a way that NiO forms sulfide in a high-temperature reduction atmosphere, thereby suppressing the generation of $H_2S$. Thus, the catalyst shows an excellent $H_2S$-reducing effect. However, the catalyst for purification of exhaust gas as described in Document 1 has a problem that NiO, which is an environmentally hazardous substance, has to be used. Additionally, under high load conditions where the driving condition rapidly changes, such as hill-climbing or high-speed driving following low-speed driving on a city road, the amount of $H_2S$ emitted is not always sufficiently reduced with such a catalyst for purification of exhaust gas.

Meanwhile, Document 2 (SAE Paper Number 900611 [N.E. CHEMCAT Corporation]) discloses a catalyst for purification of exhaust gas, in which 0.03 mol/L-cat of Mo is supported on a catalyst formed by supporting platinum and rhodium (noble metals) on ceria (metal oxide support). However, although there is a report that such a catalyst for purification of exhaust gas described in Document 2 reduced the amount of $H_2S$ emitted into ¼, the ranges of added amounts necessary for the balance of the three-way activities are not explicitly shown.

Incidentally, Japanese Unexamined Patent Application Publication No. 2004-167354 (Document 3) discloses a catalyst for purification of exhaust gas comprising a composite oxide obtained by mixing $Al_2O_3$ and an acidic oxide made of at least one of $ZrO_2$ and $TiO_2$ in a primary-particle level; a noble metal supported on the composite oxide; and phosphorus added to the composite oxide. However, such a catalyst for purification of exhaust gas cannot always sufficiently reduce the amount of $H_2S$ emitted. In addition, such a catalyst for purification of exhaust gas does not function as a three-way catalyst, and the catalyst has to contain a basic substance or the like in order to function as a three-way catalyst.

DISCLOSURE OF THE INVENTION

The present invention has been made in consideration of the above-described problems of the conventional techniques. An object thereof is to provide a catalyst for purification of exhaust gas capable of sufficiently reducing an amount of $H_2S$ emitted not only under normal operation conditions but also under high load conditions while exhibiting a sufficiently high catalytic activity as a three-way catalyst; and an apparatus and a method for purification of exhaust gas using the catalyst.

The present inventors have earnestly studied in order to achieve the above object. As a result, the inventors have found that a conventional catalyst for purification of exhaust gas cannot sufficiently reduce the amount of $H_2S$ emitted due to accumulation of sulfur components in the catalyst. Then, the inventors have further earnestly studied and consequently found that a catalyst for purification of exhaust gas, in which a noble metal is supported on a metal oxide support, becomes capable of sufficiently reducing the amount of $H_2S$ emitted not only under normal operation conditions but also under high load conditions while exhibiting a sufficiently high catalytic activity as a three-way catalyst, provided that the catalyst for purification of exhaust gas is made to have a basic site content of 1 mmol/L-cat or less, as determined on the basis of an amount of $CO_2$ desorbed per liter of the catalyst as measured by a $CO_2$ temperature-programmed desorption method. Such discovery has led the inventors to complete the present invention.

Specifically, a catalyst for purification of exhaust gas of the present invention, in which a noble metal is supported on a metal oxide support, has a basic site content of 1 mmol/L-cat or less, as determined on the basis of an amount of $CO_2$ desorbed per liter of the catalyst as measured by a $CO_2$ temperature-programmed desorption method.

The catalyst for purification of exhaust gas of the present invention preferably has a basic site content of 0.5 mmol/L-cat or less.

In addition, in the catalyst for purification of exhaust gas of the present invention, an element which has an electronegativity higher than that of a cation of a metal element forming the metal oxide support is preferably supported on the metal oxide support.

Moreover, in the catalyst for purification of exhaust gas of the present invention, at least one of elements selected from the group consisting of phosphorus, molybdenum, tungsten, titanium, iron and silicon is preferably supported on the metal oxide support, and an amount of each element supported per liter of the catalyst is more preferably 0.01 to 1.0 mol/L-cat (further preferably 0.03 to 0.3 mol/L-cat, particularly preferably 0.05 to 0.22 mol/L-cat).

Moreover, in the catalyst for purification of exhaust gas of the present invention, the metal oxide support has a specific surface area of preferably 3 to 200 m²/g (more preferably 10 to 150 m²/g).

In addition, in the catalyst for purification of exhaust gas of the present invention, an amount of the noble metal supported per liter of the catalyst is preferably 0.1 to 10 g/L-cat.

In addition, an apparatus for purification of exhaust gas of the present invention comprises the catalyst for purification of exhaust gas of the present invention.

Moreover, a method for purification of exhaust gas of the present invention is a method, wherein exhaust gas is brought into contact with the catalyst for purification of exhaust gas of the present invention to purify the exhaust gas.

Here, it is not exactly known why the catalyst for purification of exhaust gas of the present invention is capable of sufficiently reducing the amount of $H_2S$ emitted not only under normal operation conditions but also under high load conditions while exhibiting a sufficiently high catalytic activity as a three-way catalyst. The present inventors, however, speculate as follows. Specifically, the catalyst for purification of exhaust gas of the present invention has a basic site content of 1 mmol/L-cat or less, as determined on the basis of an amount of $CO_2$ desorbed per liter of the catalyst as measured by a $CO_2$ temperature-programmed desorption method. The basic site content is smaller than that of a conventional catalyst for purification of exhaust gas. Such basic sites are sites where sulfur components strongly adhere when the catalyst comes into contact with exhaust gas containing the sulfur component in an oxidation atmosphere. For this reason, even in a low-temperature operation atmosphere of approximately 450° C., the catalyst for purification of exhaust gas of the present invention is sufficiently prevented from accumulation of sulfur components in a reduction atmosphere (under a low-temperature stoichiometric or rich condition). Moreover, the present inventors speculate that generation of $H_2S$ is sufficiently prevented, since the accumulation of sulfur components in the catalyst is sufficiently prevented under high load conditions where a driving condition rapidly changes, such as hill-climbing or high-speed driving following low-speed driving on a city road. Furthermore, in the present invention, in order that the catalyst has a basic site content of 1 mmol/L-cat or less, an element having an electronegativity higher than that of a cation of a metal element forming the metal oxide support can be supported on the metal oxide support. In such a case, the basic site content is lowered to reduce the content of the sulfur-adhesion sites. Moreover, in such a case, sulfur components together with the above element can produce sulfide (for example, $MoS_2$) in a reduction atmosphere, and accordingly the sulfur components can be trapped in the reduction atmosphere. Then, the trapped sulfur components can be desorbed in the form of $SO_2$ in an oxidation atmosphere. Thus, the present inventors speculate generation of $H_2S$ is more sufficiently prevented.

According to the present invention, it is possible to provide a catalyst for purification of exhaust gas capable of sufficiently reducing the amount of $H_2S$ emitted not only under normal operation conditions but also under high load conditions while exhibiting a sufficiently high catalytic activity as a three-way catalyst; and an apparatus and a method for purification of exhaust gas using the catalyst.

DETAILED DESCRIPTION OF THE PREFERRED EMBODIMENTS

Hereinafter, the present invention will be described in detail with reference to preferred embodiments thereof.

First, a catalyst for purification of exhaust gas of the present invention will be described. Specifically, the catalyst for purification of exhaust gas of the present invention, in which a noble metal is supported on a metal oxide support, has a basic site content of 1 mmol/L-cat or less, as determined on the basis of an amount of $CO_2$ desorbed per liter of the catalyst as measured by a $CO_2$ temperature-programmed desorption method.

Figure 1:
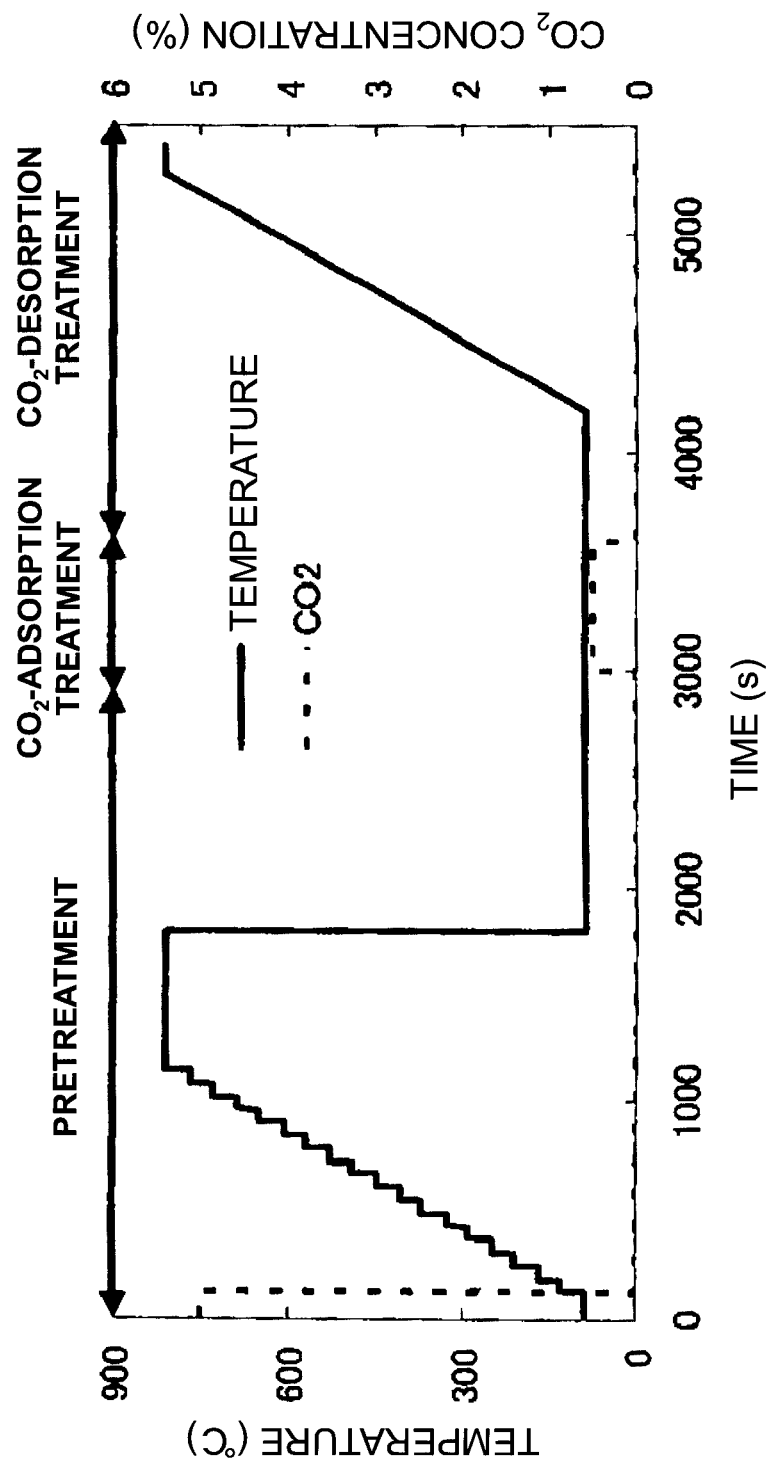
FIG. 1 is a graph showing a relationship between the temperature of inlet gas and time as well as a relationship between the $CO_2$ concentration and time, during a pretreatment, a $CO_2$-adsorption treatment and a $CO_2$-desorption treatment in a method for measuring a "basic site content" adopted in the present invention.

The basic site content according to the present invention is, as described above, determined on the basis of an amount of $CO_2$ desorbed per liter of the catalyst as measured by the $CO_2$ temperature-programmed desorption method. Now, a method for measuring the "basic site content" in the present invention will be described. Note that FIG. 1 depicts a graph showing a relationship between the temperature of inlet gas and time as well as a relationship between the $CO_2$ concentration and time, during a pretreatment, a $CO_2$-adsorption treatment and a $CO_2$-desorption treatment in performing such a method for measuring the "basic site content".

In such a measurement of "basic site content", first, a sample of the catalyst for purification of exhaust gas is prepared, the sample having a diameter of 30 mm, a length of 50 mm, and a volume of 35 cc. Note that such a sample is produced by coating a substrate having a diameter of 30 mm, a length of 50 mm, and a volume of 35 cc, with the metal oxide support and the noble metal supported on the metal oxide support in predetermined amounts. Then, such a sample is placed in a reactor described in Japanese Unexamined Patent Application Publication No. 2002-311013 (JP 2002-311013 A). Subsequently, gas containing $CO_2$ (5% by volume) and $N_2$ (95% by volume) is brought into contact with the sample for 2 minutes at a flow rate of 5 L/min. Incidentally, the temperature of the gas at this time is 90° C. Thereafter, rich gas containing $H_2$ (4% by volume) and $N_2$ (96% by volume) and lean gas containing $O_2$ (4% by volume) and $N_2$ (96% by volume) are alternately brought into contact with the sample for every 60 seconds. At this time, the initial temperature of the gases (the rich gas and the lean gas) that are brought into contact with the sample is set to 90° C., and then the temperature is raised up to 810° C. at a rate of temperature rise of 40° C./min. Moreover, the gases that are brought into contact with the sample are flowed toward the sample at a flow rate of 5 L/min. After the temperature of the gas reaches 810° C., the temperature of the gas is maintained at 810° C. Then, the lean gas and the rich gas are brought into contact with the sample for 10 minutes at a flow rate of 5 L/min while alternately changed in 10 seconds and 20 seconds, respectively. After that, $N_2$ gas at 90° C. is brought into contact with the sample for 20 minutes at a flow rate of 5 L/min (pretreatment). Next, gas containing $CO_2$ (0.5% by volume) and $N_2$ (99.5% by volume) at 90° C. is brought into contact with the catalyst for purification of exhaust gas after the pretreatment for 10 minutes at a flow rate of 5 L/min. Thereby, $CO_2$ is adsorbed to the sample ($CO_2$-adsorption treatment). Subsequently, $N_2$ gas at 90° C. is brought into contact with the sample to which $CO_2$ is adsorbed for 5 minutes at a flow rate of 10 L/min. Thereafter, $N_2$ gas is further brought into contact with the sample for 5 minutes at a flow rate of 5 L/min. After that, $N_2$ gas is brought into contact with the sample at a flow rate of 5 L/min while the gas temperature is being raised up to 810° C. at a rate of temperature rise of 40° C./min. Thereby, $CO_2$ is desorbed ($CO_2$-desorption treatment). Then, the amount of $CO_2$ in outlet gas in such a $CO_2$-desorption treatment is measured from when the temperature of $N_2$ gas starts to be raised until when the gas temperature reaches 810° C. In measuring such a gas concentration, an analyzer which is manufactured by HORIBA, Ltd. and whose product name is "MEXA-4300FT" was used. Subsequently, the amount of $CO_2$ desorbed from the sample is converted to the amount per liter of the catalyst, and the basic site content of the catalyst is calculated. In such a calculation of the basic site content, systematic errors are presumably present, since the background level of the equipment used for the measurement and the measuring conditions at the time of the $CO_2$-desorption treatment test is 20 to 30 ppm. For this reason, the following method is adopted as a method for calculating the basic site content in the present invention. Specifically, the backgrounds of $CO_2$ concentration at the time of starting the temperature rising in the $CO_2$-desorption treatment and at the time of completing the $CO_2$-desorption treatment shown in FIG. 1 are connected by a straight line. The peak area of a desorption peak observed as a peak corresponding to a concentration equal to or above the background level is determined by integration to calculate the basic site content. Note that a value of the basic site content of the sample that can be calculated in this manner is proportional to a coating amount per liter of the catalyst (g/L-cat) comprising components supported on a substrate (the components including the metal oxide support and the noble metal supported on the metal oxide support). For example, when a sample (I) coated with a component (A) in a specific amount (g/L-cat) has a basic site content of 5.0 mmol/L-cat, a sample (II) coated with the component (A) in a coating amount (g/L-cat) of half the specific amount has a basic site content (2.5 mmol/L-cat) that is half the value of the basic site content of the sample (I). A sample (III) coated with a catalyst component in a coating amount (g/L-cat) of double the specific amount has a basic site content (10 mmol/L-cat) that is double the basic site content of the sample (I). Accordingly, when a sample is prepared by supporting a predetermined amount of a component to be supported on a substrate to then calculate the basic site content of the sample, the basic site content per liter of a catalyst in which an identical supported component is supported can be calculated on the basis of the coating amount (g/L-cat). Thus, when the basic site content is measured using the sample coated with the predetermined amount of the supported component, the basic site content per liter of the catalyst can be appropriately adjusted by adjusting the coating amount (g/L-cat) of an identical supported component. Note that the "basic site content" herein greatly varies depending on the kind of a support, a specific surface area, and an additive material. Thus, the "basic site content" is a basic site content of a fresh catalyst for purification of exhaust gas (which may include one that has been used for 10000-km driving, more preferably 1000-km driving, and further preferably less than 100-km driving) that has a foremost concern for generation of $H_2S$ under a condition where a fuel containing sulfur at a high content is used.

Additionally, in the present invention, the catalyst for purification of exhaust gas has a basic site content of 1 mmol/L-cat or less. The basic site content is preferably 0.8 mmol/L-cat or less, more preferably 0.5 mmol/L-cat or less, and particularly preferably 0.3 mmol/L-cat or less. If the basic site content exceeds the upper limit, when the catalyst comes into contact with exhaust gas containing a sulfur component in an oxidation atmosphere, the catalyst cannot sufficiently be prevented from sulfur poisoning under a low-temperature stoichiometric or rich condition. This is because the basic site is a site where the sulfur component strongly adheres. Furthermore, the sulfur component is desorbed in a high-temperature reduction atmosphere, generating $H_2S$. Consequently, the amount of $H_2S$ emitted cannot be reduced sufficiently.

Note that, in the present invention, a value of the basic site content is, as described above, preferably 0.8 mmol/L-cat or less, further preferably 0.5 mmol/L-cat or less, and most preferably 0.3 mmol/L-cat or less. However, from the viewpoint of the balance of the stabilization of the noble metal, heat resistance and catalyst performance, it is preferable to leave the basic site content as little as 1 mmol/L-cat or less.

Moreover, the catalyst for purification of exhaust gas of the present invention is obtained by supporting the noble metal on the metal oxide support. A metal oxide forming such a metal oxide support is not particularly limited. Known metal oxides such as activated alumina, alumina-ceria-zirconia, ceria-zirconia, zirconia, and lanthanum-stabilized activated alumina, which are usable as a support for a three-way catalyst, can be used as appropriate. The metal oxide is preferably at least one selected from the group consisting of oxides of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), ruthenium (Lu), yttrium (Y), zirconium (Zr), aluminium (Al), magnesium (Mg) and vanadium (V), solid solutions thereof, and composite oxides thereof. Furthermore, among such metal oxides, from the viewpoint of obtaining a higher activity as a three-way catalyst, more preferable is at least one selected from the group consisting of $CeO_2$, $ZrO_2$, $Y_2O_3$, $TiO_2$, $Al_2O_3$, solid solutions thereof, and composite oxides thereof. Particularly preferable is a composite oxide containing $Al_2O_3$ and Ce.

Moreover, the metal oxide support has a specific surface area of preferably 3 to 200 $m^2/g$, and more preferably 10 to 150 $m^2/g$. If the specific surface area exceeds the upper limit, the content of sites where sulfur components adhere tends to be increased, and there is a tendency that $H_2S$ is readily generated. If the specific surface area falls below the lower limit, there is a tendency that the catalyst performance is lowered. Such a specific surface area can be calculated as a BET specific surface area from an adsorption isotherm by using a BET isothermal adsorption equation. Note that a method for producing such a metal oxide support is not particularly limited, and a known method can be adopted appropriately. In addition, a commercially-available support may be used as such a metal oxide support.

Furthermore, as such a metal oxide support, a support by itself having a basic site content of 0.02 to 0.2 mmol/L is preferably used, and a support by itself having a basic site content of 0.03 to 0.15 mmol/L is more preferably used. If the basic site content of such a metal oxide support exceeds the upper limit, it becomes difficult for the catalyst for purification of exhaust gas to have a basic site content of 1 mmol/L-cat or less. Note that a method similar to the above-described method for measuring the basic site content of the catalyst for purification of exhaust gas is adopted as a method for measuring a basic site content of such a metal oxide support, except that a sample made from only a metal oxide support is used.

A supported amount of such a metal oxide support when the metal oxide support is supported on a substrate is preferably 40 to 270 g/L-cat, more preferably 40 to 220 g/L-cat, and particularly preferably 50 to 160 g/L-cat, per 1-L volume of the substrate. If the supported amount of such a metal oxide support falls below the lower limit, there is a tendency that it becomes difficult to exhibit the sufficient catalytic activity. Meanwhile, if the supported amount exceeds the upper limit, there is a tendency that the warm-up characteristic is lowered, and the pressure loss tends to be increased.

Moreover, the noble metal is preferably at least one selected from the group consisting of ruthenium, rhodium, palladium, silver, iridium, platinum and gold. The inclusion of such a noble metal allows a higher catalytic activity to be exhibited more likely. Additionally, among such noble metals, from the viewpoint that a higher level of catalytic activity on particulate matters can be exhibited, platinum, rhodium, or palladium is preferably used, and platinum is particularly preferably used. Note that these noble metals can be used alone or in combination of two or more. Furthermore, a method for supporting such a noble metal on the metal oxide support is not particularly limited, and a known method can be adopted as appropriate. For example, the following method may be adopted. Specifically, the metal oxide support is impregnated with an aqueous solution containing a salt (for example, a dinitrodiamine salt) or a complex (for example, a tetraamine complex) of the noble metal, followed by drying and calcining.

A supported amount of the noble metal per liter of the catalyst is preferably 0.1 to 10 g/L-cat, and more preferably 0.2 to 5 g/L-cat. If the supported amount of such a noble metal falls below the lower limit, there is a tendency that it becomes difficult to exhibit a sufficient catalytic activity. Meanwhile, if the supported amount exceeds the upper limit, there is a tendency that the cost is increased since the activity is saturated.

Moreover, the catalyst for purification of exhaust gas comprising such a metal oxide support and a noble metal supported on the metal oxide support may appropriately contain a known additive (for example, alkali metal, alkaline earth metal, or the like) which can be used in a three-way catalyst.

Moreover, in the present invention, in order that the catalyst for purification of exhaust gas has a basic site content of 1 mmol/L-cat or less, an element which has an electronegativity higher than that of a cation of a metal element forming the metal oxide support is preferably supported on the metal oxide support. When the element which has an electronegativity higher than that of a cation of the metal element forming the metal oxide support is supported on the metal oxide support, the basic site content can be efficiently made to be 1 mmol/L-cat or less. Additionally, the content of the sited where sulfur adheres is efficiently reduced. Furthermore, the sulfur component together with the element can produce sulfide in a reduction atmosphere. Accordingly, the sulfur components can be trapped in the reduction atmosphere. Then, the trapped sulfur components can be desorbed in the form of $SO_2$ in an oxidation atmosphere. Thus, there is a tendency that generation of $H_2S$ can be further reduced.

Moreover, such an element which has an electronegativity higher than that of a cation of the metal element forming the metal oxide support differs depending on the kind of the metal element forming the metal oxide support. However, phosphorus, molybdenum, tungsten, titanium, silicon or iron is more preferable as the element. From the viewpoint of the catalytic activity, phosphorus, molybdenum, tungsten or titanium is particularly preferable. Note that such an element which has an electronegativity higher than that of a cation of the metal element forming the metal oxide support can be used alone or in mixture of two or more.

Moreover, a supported amount, per liter of the catalyst, of the element which has an electronegativity higher than that of a cation of the metal element forming the metal oxide support cannot be stated generally. This is because the amounts of the supported element required for the catalyst having a basic site content of 1 mmol/L-cat or less are variable depending on the kind of the metal oxide support, the specific surface area of the metal oxide support, the kind of another additive, and the like. However, from the viewpoint of obtaining a higher OSC capability with sufficiently reducing the amount of $H_2S$ emitted, the supported amount of each element supported on the support is preferably within a range of 0.01 to 1.0 mol/L-cat (more preferably 0.03 to 0.3 mol/L-cat, and further preferably 0.05 to 0.22 mol/L-cat). In particular, when the element is phosphorus, the supported amount thereof is preferably 0.03 to 0.3 mol/L-cat (more preferably 0.05 to 0.2 mol/L-cat). In a case of molybdenum, the supported amount is preferably 0.05 to 0.22 mol/L-cat (more preferably 0.08 to 0.2 mol/L-cat). In a case of tungsten or titanium, the supported amount is preferably 0.01 to 0.2 mol/L-cat (more preferably 0.05 to 0.15 mol/L-cat). If the supported amount falls below the lower limit, the catalyst for purification of exhaust gas tends not to have a basic site content of 1 mmol/L-cat or less, and there is a tendency that the amount of $H_2S$ emitted cannot be reduced sufficiently. Meanwhile, if the supported amount exceeds the upper limit, the OSC capability of the catalyst for purification of exhaust gas tends to be lowered, and there is a tendency that a component such as HC, CO or $NO_x$ cannot be purified sufficiently.

Furthermore, a method for supporting such an element which has an electronegativity higher than that of a cation of the metal element forming the metal oxide support, on the metal oxide support is not particularly limited. A known method which allows the element to be supported on the metal oxide can be adopted as appropriate. For example, the following method may be adopted. Specifically, the metal oxide support is impregnated with a salt (for example, aqueous solution of chloride or nitrate) of the element or an alcohol solution of an alkoxide of the element, followed by drying and calcining.

Moreover, the shape of the catalyst for purification of exhaust gas of the present invention is not particularly limited. The shapes can be a honeycomb shape of a monolith catalyst, a pellet shape of a pellet catalyst, and the like. In addition, such a catalyst for purification of exhaust gas preferably comprises the substrate, the metal oxide support supported on the substrate, and the noble metal supported on the metal oxide support. The substrate used herein is not particularly limited, and appropriately selected depending on the use of the obtained catalyst and the like. However, a DPF substrate, a monolithic substrate, a pellet-like substrate, a plate-like substrate, or the like is suitably employed. Additionally, the material of such a substrate are not particularly limited, but a substrate made from ceramic such as cordierite, silicon carbide and mullite, and a substrate made from metal such as stainless steel containing chromium and aluminium are suitably employed. Furthermore, a method for producing such a catalyst is not particularly limited. For example, when a monolithic catalyst is produced, the following method can be adopted. Specifically, the catalyst for purification of exhaust gas is supported on a honeycomb-shaped substrate formed from cordierite or metal foil.

Hereinabove, the catalyst for purification of exhaust gas of the present invention has been described. Now, hereinbelow, an apparatus for purification of exhaust gas of the present invention and a method for purification of exhaust gas of the present invention will be described. Specifically, the apparatus for purification of exhaust gas of the present invention comprises the above-described catalyst for purification of exhaust gas of the present invention. Moreover, the method for purification of exhaust gas of the present invention is a method in which the exhaust gas is brought into contact with the catalyst for purification of exhaust gas of the present invention to purify the exhaust gas. In this manner, the apparatus for purification of exhaust gas of the present invention and the method for purification of exhaust gas of the present invention use the catalyst for purification of exhaust gas of the present invention. Accordingly, a component such as HC, CO or $NO_x$ can be sufficiently purified. In addition, even when the catalyst is exposed to exhaust gas containing $SO_2$, sulfur poisoning is prevented, and thus the amount of $H_2S$ emitted can be reduced. Moreover, the accumulation of sulfur components in the catalyst is prevented even under high load conditions where the driving condition rapidly changes, such as hill-climbing or high-speed driving following low-speed driving on a city road. Accordingly, the generation of $H_2S$ can be prevented. Therefore, the apparatus for purification of exhaust gas and the method for purification of exhaust gas of the present invention can be suitably used as an apparatus for purification of exhaust gas and a method for purification of exhaust gas, respectively, to purify exhaust gas emitted from, for example, internal combustion engines of automobiles, and the like.

EXAMPLES

Hereinafter, the present invention will be described more specifically on the basis of Examples and Comparative Examples. However, the present invention is not limited to the following Examples.

Synthesis Example 1

First, a honeycomb substrate which was made from cordierite and had a diameter of 30 mm, a length of 50 mm, a volume of 35 cc, 400 cells/in$^2$, and 4 mil was coated with a slurry containing θ-alumina (specific surface area of approximately 100 m$^2$/g) such that the amount of θ-alumina supported was 100 g/L-cat per liter of a catalyst. Then, the resultant substrate was calcined under a temperature condition of 500° C. for one hour. Thereby, θ-alumina (metal oxide support) was supported on the honeycomb substrate. Thus, a catalyst support was obtained.

Next, platinum (Pt) was supported on the above-described catalyst precursor by an impregnation using a nitric acid aqueous solution of dinitrodiamine platinum such that the amount of Pt supported was 1 g/L-cat per liter of the catalyst. Then, the resultant precursor was calcined at 500° C. for one hour. Thereby, a honeycomb catalyst in which the noble metal was supported on θ-alumina (metal oxide support) was produced.

Synthesis Example 2

A honeycomb catalyst containing an alumina-ceria-zirconia composite oxide was produced in the same manner as in Synthesis Example 1 except that a slurry containing 100 g/L-cat of lanthanum-stabilized activated alumina (specific surface area of approximately 150 m$^2$/g) and 100 g/L-cat of an alumina-ceria-zirconia composite oxide (ACZ: specific surface area of approximately 80 m$^2$/g) was used in place of the slurry containing θ-alumina.

Synthesis Example 3

A honeycomb catalyst containing a ceria-zirconia composite oxide was produced in the same manner as in Synthesis Example 1 except that a slurry containing 100 g/L-cat of a ceria-zirconia composite oxide (CZ: specific surface area of approximately 70 m$^2$/g) was used in place of the slurry containing θ-alumina.

Examples 1 to 5 and Comparative Example 1 to 3

Eight catalysts obtained in Synthesis Example 1 were prepared. Solutions for preparing catalysts for purification of exhaust gas shown below were used in each of Examples and Comparative Examples. Supporting was performed by impregnating each of the catalysts with the following solution such that the supported amount of each supported element after calcination was 0.1 mol/L-cat per litter of the catalyst. After being dried, the resultant catalyst was calcined in air under a temperature condition of 500° C. Thereby, each catalyst for purification of exhaust gas was produced.

<Solutions for Preparing Catalysts for Purification of Exhaust Gas>

Example 1: aqueous solution of phosphoric acid [element supported on catalyst: P]
Example 2: diluted ethanol solution of tetraethyl orthosilicate [element supported on catalyst: Si]
Example 3: diluted ethanol solution of titanium (IV) tetrabutoxide monomer [element supported on catalyst: Ti]
Example 4: aqueous solution of ammonium paramolybdate [element supported on catalyst: Mo],
Example 5: aqueous solution of ammonium paratungstate [element supported on catalyst: W],
Comparative Example 1: aqueous solution of magnesium nitrate [element supported on catalyst: Mg]
Comparative Example 2: aqueous solution of barium nitrate [element supported on catalyst: Ba]
Comparative Example 3: aqueous solution of iron nitrate [element supported on catalyst: Fe].

Comparative Example 4

As a catalyst for comparison, a honeycomb catalyst obtained in Synthesis Example 1 was directly used as a catalyst for purification of exhaust gas.

Examples 6 to 9 and Comparative Examples 5 to 9

Eight catalysts obtained in Synthesis Example 3 were prepared. Solutions for preparing catalysts for purification of exhaust gas shown below were used in each of Examples and Comparative Examples. Supporting was performed by impregnating each of the catalysts with the following solution such that the supported amount of the supported element after calcination was 0.1 mol/L-cat per litter of the catalyst. After being dried, the resultant catalyst was calcined in air under a temperature condition of 500° C. Thereby, each catalyst for purification of exhaust gas was produced.

<Solutions for Preparing Catalysts for Purification of Exhaust Gas>

Example 6: aqueous solution of phosphoric acid [element supported on catalyst: P]
Example 7: aqueous solution of ammonium paramolybdate [element supported on catalyst: Mo]
Example 8: aqueous solution of iron nitrate [element supported on catalyst: Fe]
Example 9: aqueous solution of ammonium paratungstate [element supported on catalyst: W]
Comparative Example 5: diluted ethanol solution of tetraethyl orthosilicate [element supported on catalyst: Si]
Comparative Example 6: diluted ethanol solution of titanium (IV) tetrabutoxide monomer [element supported on catalyst: Ti]
Comparative Example 7: aqueous solution of magnesium nitrate [element supported on catalyst: Mg]
Comparative Example 8: aqueous solution of barium nitrate [element supported on catalyst: Ba].

Comparative Example 9

As a catalyst for comparison, a honeycomb catalyst obtained in Synthesis Example 3 was directly used as a catalyst for purification of exhaust gas.

Comparative Example 10

As a catalyst for comparison, a honeycomb catalyst obtained in Synthesis Example 2 was directly used as a catalyst for purification of exhaust gas.

Examples 10 and 11 and Comparative Examples 11 and 12

Catalysts for purification of exhaust gas were produced by adopting the same method as that in Synthesis Example 2 except that each catalyst precursor was impregnated with an aqueous solution of phosphoric acid prior to supporting platinum thereon, followed by drying and then by calcining under a temperature condition of 1000° C. for 5 hours. Note that the amounts of added phosphorus after the calcination in Examples 10 and 11 and Comparative Examples 11 and 12 were the amounts shown in Table 1, respectively.

TABLE 1

| Comparative Example 11 | P: 0.01 mol/L-cat |
| Comparative Example 12 | P: 0.02 mol/L-cat |
| Example 10 | P: 0.1 mol/L-cat |
| Example 11 | P: 0.28 mol/L-cat |

Examples 12 and 13

Catalysts for purification of exhaust gas were produced by adopting the same method as that in Example 10 except that the amounts of added phosphorus after the calcination were the amounts shown in Table 2. However, it was ascertained that the thus-obtained catalysts for purification of exhaust gas had lowered catalytic activities and OSC capabilities as well as lowered catalyst performances.

TABLE 2

| Example 12 | P: 0.4 mol/L-cat |
| Example 13 | P: 0.5 mol/L-cat |

Example 14

A catalyst for purification of exhaust gas was produced by adopting the same method as that in Example 10 except that platinum (Pt) and rhodium (Rh) were supported in place of platinum, and that the amounts of platinum (Pt) and rhodium (Rh) supported were 1 g/L-cat and 0.2 g/L-cat, respectively. The basic site content of the thus-obtained catalyst for purification of exhaust gas was measured by adopting the method described above, and the basic site content was 0.0 mmol/L-cat.

Comparative Example 13

A catalyst for purification of exhaust gas was produced by adopting the same method as that in Example 10 except that no phosphorus was supported. Note that the basic site content of the thus-obtained catalyst for purification of exhaust gas was measured by adopting the method described above, and the basic site content was 6.0 mmol/L-cat.

Examples 15 to 17 and Comparative Examples 14 and 15

First, a honeycomb catalyst was produced in the same manner as in Synthesis Example 2 except that platinum (Pt) and rhodium (Rh) were supported in place of platinum, and that the amounts of platinum (Pt) and rhodium (Rh) supported were 1 g/L-cat and 0.2 g/L-cat, respectively.

Next, supporting was performed by impregnating the obtained catalyst with an aqueous solution of paramolybdate ammonium. After being dried, the resultant catalyst was calcined at 500° C. for one hour. Thereby, each of catalysts for purification of exhaust gas was obtained. Note that the amounts of added molybdenum after the calcination in Examples 15 to 17 and Comparative Examples 14 and 15 were the amounts shown in Table 3, respectively.

TABLE 3

| | |
|---|---|
| Comparative Example 14 | Mo: 0.00 mol/L-cat |
| Example 15 | Mo: 0.05 mol/L-cat |
| Example 16 | Mo: 0.18 mol/L-cat |
| Example 17 | Mo: 0.22 mol/L-cat |
| Comparative Example 15 | Mo: 0.28 mol/L-cat |

Examples 18 and 19 and Comparative Examples 16 and 17

Catalysts for purification of exhaust gas were produced by adopting the same method as that in Example 10 except that a honeycomb substrate which was made from cordierite and had a diameter of 30 mm, a length of 25 mm, a volume of 17.5 cc, 400 cells/in$^2$, and 4 mil was used. Note that the amounts of added molybdenum after the calcination in Examples 18 and 19 and Comparative Examples 16 and 17 were the amounts described in Table 4, respectively.

TABLE 4

| | |
|---|---|
| Comparative Example 16 | Mo: 0.00 mol/L-cat |
| Example 18 | Mo: 0.05 mol/L-cat |
| Example 19 | Mo: 0.20 mol/L-cat |
| Comparative Example 17 | Mo: 0.39 mol/L-cat |

[Characteristic Evaluation of Catalysts for Purification of Exhaust Gas Obtained in Examples 1 to 5 and Comparative Examples 1 to 4]

<Measurement of Basic Site Content>

The basic site contents of the catalysts for purification of exhaust gas obtained in Examples 1 to 5 and Comparative Examples 1 to 4 were measured by adopting the above-described method for measuring a basic site content (see FIG. 1). Note that the measured values of the basic site contents presumably include systematic errors, since the background level of the equipment used for the measurement and the measuring conditions at the time of the $CO_2$-desorption treatment test is 20 to 30 ppm. For this reason, as described above, in calculating the basic site contents, the following method for calculating a basic site content was adopted. Specifically, the backgrounds of the $CO_2$ concentration at the time of starting the temperature rising in the $CO_2$-desorption treatment and at the time of completing the $CO_2$-desorption treatment shown in FIG. 1 were connected by a straight line. The peak area of a desorption peak observed as a peak corresponding to a concentration equal to or above the background level was determined by integration to calculate the basic site content. Table 5 shows the thus-measured basic site contents of the catalysts.

<Measurement of Amount of $H_2S$ Emitted>

The catalysts for purification of exhaust gas (Examples 1 to 5 and Comparative Examples 1 to 4) after the measurement of the basic site contents was subjected to a sulfur-poisoning treatment as shown below. Then, a temperature-programmed desorption test for a sulfur component was performed in a reduction atmosphere to measure the amount of $H_2S$ emitted when each catalyst was used.

Figure 2:
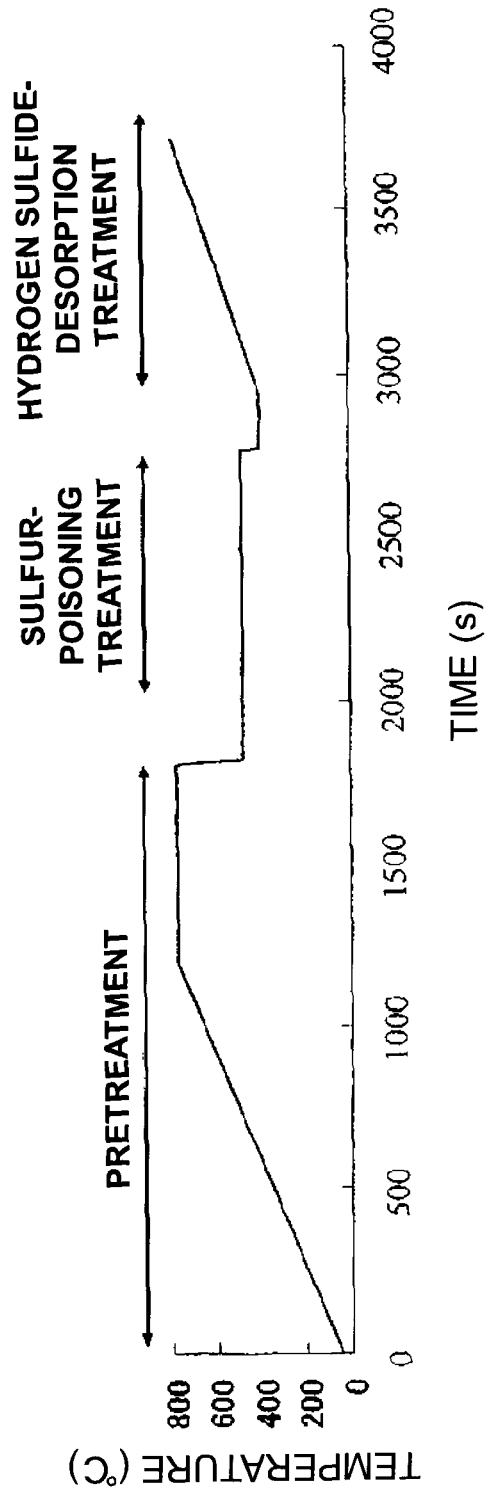
FIG. 2 is a graph showing a relationship between the temperature of the inlet gas and time in measuring the amounts of $H_2S$ emitted of catalysts for purification of exhaust gas obtained in Examples 1 to 5 and Comparative Examples 1 to 4.
Figure 3:
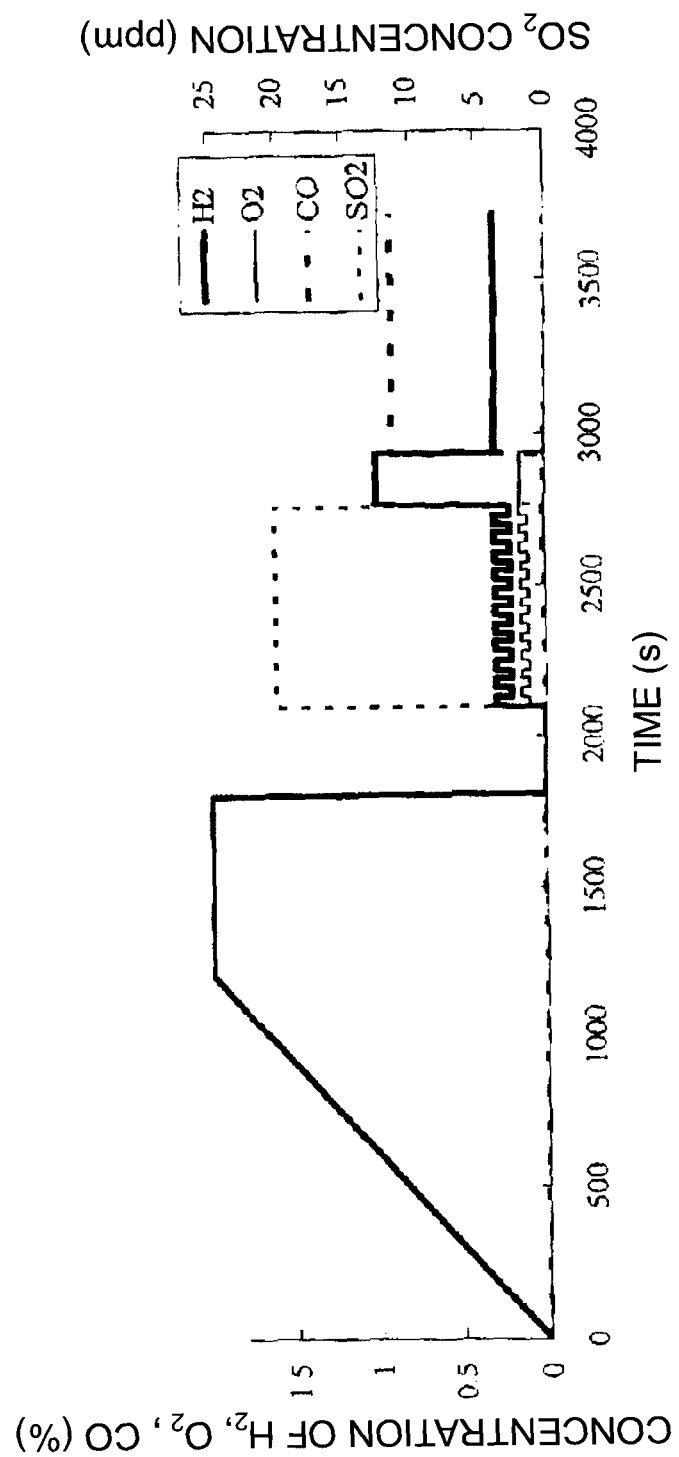
FIG. 3 is a graph showing a relationship between the concentration of each component in the inlet gas and time in measuring the amounts of $H_2S$ emitted of the catalysts for purification of exhaust gas obtained in Examples 1 to 5 and Comparative Examples 1 to 4.

In measuring the amounts of $H_{2S}$ emitted, first, each of the catalysts was placed in a reactor exemplified in JP 2002-311013 A. Subsequently, gas containing $CO_2$ (10% by volume), $H_2O$ (9.9% by volume) and $N_2$ (80.1% by volume) was brought into contact with each catalyst at a flow rate of 25 L/min. Incidentally, the temperature of the inlet gas at this time was set as follows. Specifically, the initial temperature was 90° C., and the temperature was raised up to 780° C. at a rate of temperature rise of 40° C./min. After the temperature reached 780° C., the temperature was maintained at 780° C. for 10 minutes. After that, the temperature was lowered down to 480° C., and maintained at the temperature for 5 minutes (pretreatment). Next, rich gas containing $H_2$ (0.3% by volume), $O_2$ (0.1% by volume), $H_2O$ (10% by volume), $SO_2$ (20 ppm) and the balance of $N_2$ and lean gas containing $H_2$ (0.2% by volume), $O_2$ (0.15% by volume), $H_2O$ (10% by volume), $SO_2$ (20 ppm) and the balance of $N_2$ were alternately brought into contact with each of the catalysts for every 30 seconds so as to bring $SO_2$ into contact with the catalyst for 10 minutes. Note that, at this time, the temperatures of the rich gas and the lean gas were maintained at 480° C. (sulfur-poisoning treatment). Subsequently, reductive gas containing CO (3% by volume), $H_2$ (2% by volume) and $H_2O$ (10% by volume) was brought into contact with each of the catalysts for 5 minutes. The temperature of the gas at this time was set to 300° C. Thereafter, reductive gas for hydrogen sulfide-desorption treatment containing CO (0.9% by volume), $H_2$ (0.3% by volume), $H_2O$ (10% by volume) and the balance of $N_2$ was brought into contact with the catalyst at a flow rate of 25 L/min while the temperature of the gas was being raised from 300° C. up to 780° C. at a rate of temperature rise of 30° C./min. Thereby, $H_2S$ was desorbed ($H_2S$-desorption treatment). Then, the amount of $H_2S$ emitted in the outlet gas in such a $H_2S$-desorption treatment was measured. Incidentally, in measuring such a gas concentration, an analyzer which was manufactured by HORIBA, Ltd. and whose product name was "MEXA-4300FT" was used. Moreover, FIG. 2 depicts a graph showing a relationship between the temperature of the inlet gas and time in such a measurement, and FIG. 3 depicts a graph showing a relationship between each component in the inlet gas and time in such a measurement. Furthermore, Table 5 shows the total amount of $H_2S$ emitted thus measured per liter of each of the catalysts.

TABLE 5

| | Additive mol/L-cat | Basic site content mmol/L-cat | Amount of $H_2S$ emitted mmol/L-cat |
|---|---|---|---|
| Example 1 | P: 0.1 | 0.25 | 0.41 |
| Example 2 | Si: 0.1 | 0.49 | 2.45 |
| Example 3 | Ti: 0.1 | 0.10 | 2.19 |
| Example 4 | Mo: 0.1 | 0.38 | 0.41 |
| Example 5 | W: 0.1 | 0.0 | 0.26 |
| Comparative Example 1 | Mg: 0.1 | 1.99 | 5.51 |

TABLE 5-continued

|  | Additive mol/L-cat | Basic site content mmol/L-cat | Amount of $H_2S$ emitteed mmol/L-cat |
| --- | --- | --- | --- |
| Comparative Example 2 | Ba: 0.1 | 14.35 | 5.20 |
| Comparative Example 3 | Fe: 0.1 | 1.44 | 4.90 |
| Comparative Example 4 | No addition | 2.07 | 3.83 |

Figure 4:
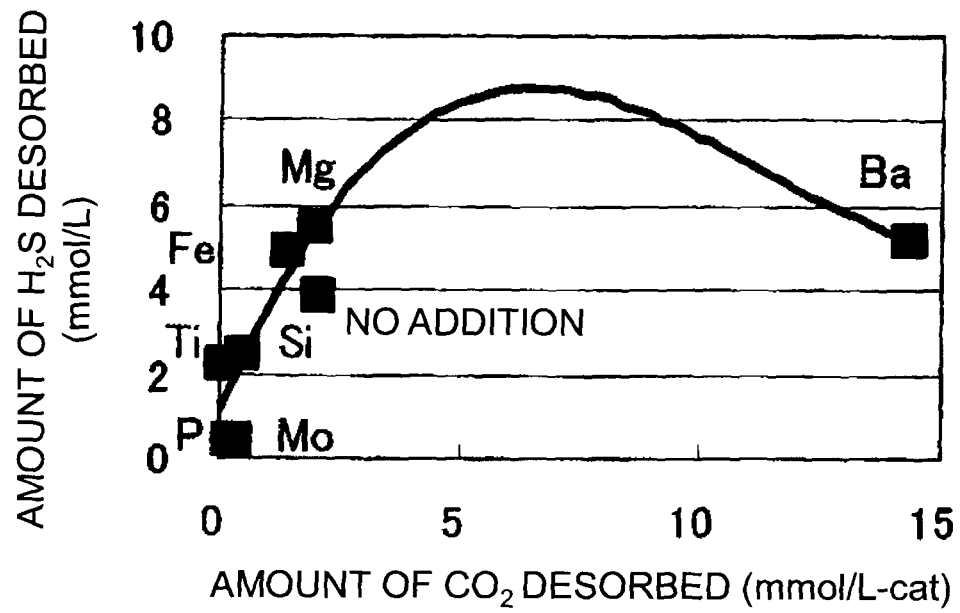
FIG. 4 is a graph showing a relationship between the amount of $H_2S$ emitted and the basic site content of the catalysts for purification of exhaust gas obtained in Examples 1 to 4 and Comparative Examples 1 to 4.

Additionally, FIG. 4 depicts a graph showing a relationship between the amount of $H_2S$ emitted and the basic site content of the catalysts for purification of exhaust gas obtained in Examples 1 to 4 and Comparative Examples 1 to 4. As apparent from the result shown in FIG. 4, it was ascertained that, among the catalysts for purification of exhaust gas obtained in Examples 1 to 4 and Comparative Examples 1 to 4, when the basic site content was 1 mmol/L-cat or less (when P, Mo, Ti, or Si was supported by 0.1 mol/L-cat, the elements having an electronegativity higher than that of a cation of the metal element (aluminium) in the metal oxide support: Examples 1 to 4), the amount of $H_2S$ emitted could be 2.5 mmol/L-cat or less. Meanwhile, it was ascertained that, when Mg or Ba was added, the elements having an electronegativity lower than that of the cation of the metal element forming the metal oxide support, the amount of $H_2S$ emitted could not be reduced sufficiently.

[Characteristic Evaluation of Catalysts for Purification of Exhaust Gas Obtained in Examples 6 to 9 and Comparative Examples 5 to 9]

The basic site contents and the amounts of $H_2S$ emitted of the catalysts for purification of exhaust gas obtained in Examples 6 to 9 and Comparative Examples 5 to 9 were measured by adopting the same methods by which the characteristics of the catalysts for purification of exhaust gas obtained in Examples 1 to 5 and Comparative Examples 1 to 4 were evaluated. Table 6 shows the thus-measured basic site content and amount of $H_2S$ emitted of each of the catalysts obtained in Examples 6 to 9 and Comparative Examples 5 to 9.

TABLE 6

|  | Additive mol/L-cat | Basic site content mmol/L-cat | Amount of $H_2S$ emitteed mmol/L-cat |
| --- | --- | --- | --- |
| Example 6 | P: 0.1 | 0.0 | 1.48 |
| Example 7 | Mo: 0.1 | 0.72 | 1.17 |
| Example 8 | Fe: 0.1 | 0.54 | 2.96 |
| Example 9 | W: 0.1 | 0.0 | 0.36 |
| Comparative Example 5 | Si: 0.1 | 1.02 | 5.36 |
| Comparative Example 6 | Ti: 0.1 | 1.29 | 4.85 |
| Comparative Example 7 | Mg: 0.1 | 1.52 | 7.45 |
| Comparative Example 8 | Ba: 0.1 | 3.35 | 5.97 |
| Comparative Example 9 | No addition (Synthesis Example 3) | 2.47 | 6.94 |

Figure 5:
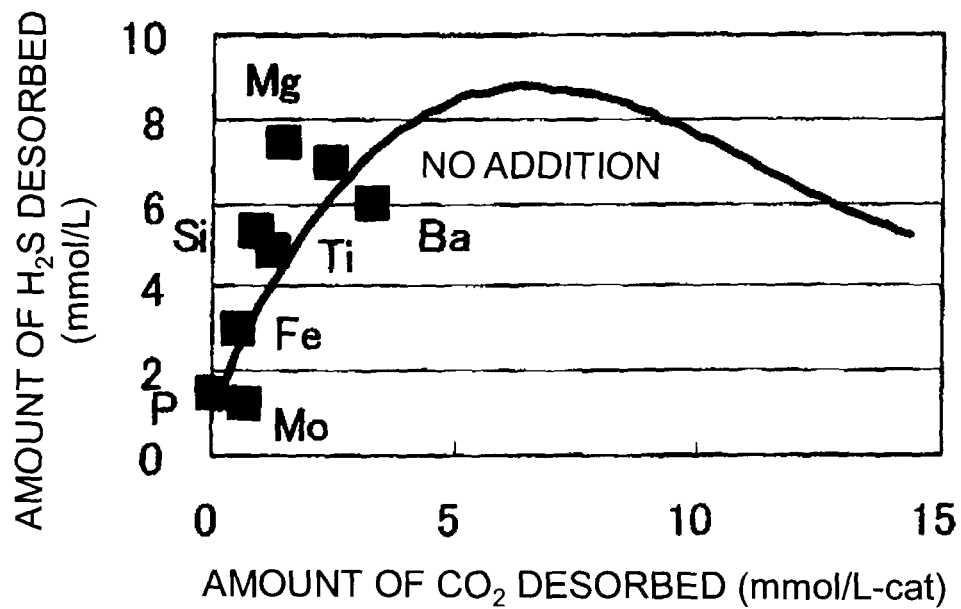
FIG. 5 is a graph showing a relationship between the amount of $H_2S$ emitted and the basic site content of catalysts for purification of exhaust gas obtained in Examples 6 to 8 and Comparative Examples 5 to 9.

Additionally, FIG. 5 depicts a graph showing a relationship between the amount of $H_2S$ emitted and the basic site content of the catalysts for purification of exhaust gas obtained in Example 6 to 8 and Comparative Examples 5 to 9. As apparent from the result shown in FIG. 5, it was ascertained that, among the catalysts for purification of exhaust gas obtained in Example 6 to 8 and Comparative Examples 5 to 9, when the basic site content was 1 mmol/L-cat or less (when P, Mo, or Fe was supported by 0.1 mol/L-cat, the elements having an electronegativity higher than that of a cation of the metal element (cerium or zirconium) in the metal oxide support: Examples 6 to 8), the amount of $H_2S$ emitted could be 4 mmol/L-cat or less.

[Characteristic Evaluation of Catalysts for Purification of Exhaust Gas in Examples 10 to 14 and Comparative Examples 10 to 13]

The basic site contents and amount of $H_2S$ emitted of the catalysts for purification of exhaust gas of Examples 10 to 14 and Comparative Examples 10 to 13 were measured by adopting the same methods by which the characteristics of the catalysts for purification of exhaust gas obtained in Examples 1 to 5 and Comparative Examples 1 to 4 were evaluated. Table 7 shows the thus-measured basic site content and amount of $H_2S$ emitted of each of the catalysts obtained in Examples 10 to 14 and Comparative Examples 10 to 13.

TABLE 7

|  | Additive mol/L-cat | Basic site content mmol/L-cat | Amount of $H_2S$ emitteed mmol/L-cat |
| --- | --- | --- | --- |
| Comparative Example 10 | No addition (Synthesis Example 2) | 6.5 | 8.9 |
| Comparative Example 11 | P: 0.01 | Unmeasured | 8.7 |
| Comparative Example 12 | P: 0.02 | 1.7 | 8.7 |
| Example 10 | P: 0.10 | 0.0 | 6.7 |
| Example 11 | P: 0.28 | 0.0 | 0.6 |
| Example 12 | P: 0.4 | 0.0 | 0.5 |
| Example 13 | P: 0.5 | 0.0 | 0.3 |
| Comparative Example 13 | No addition | 6.0 | 8.7 |
| Example 14 | P: 0.10 | 0.0 | 0.2 |

As apparent from the result shown in Table 7, it was ascertained that, when the basic site content was 1 mmol/L-cat or less (Examples 10 to 14), the amount of $H_2S$ emitted could be reduced.

Moreover, the catalysts for purification of exhaust gas obtained in Examples 10 to 14 and Comparative Examples 10 to 13 were subjected to a catalyst performance testing. It was revealed, that if the amount of P added was increased, the OSC capability and the purification characteristic were lowered. In addition, it was found out that the catalyst performance was improved by the following method and conditions. Specifically, the method for adding phosphorus was altered from the method as adopted in Example 1, in which phosphorus was added by post-impregnation, to the method as adopted Examples 10 and 14, in which phosphorous was added by impregnation prior to supporting the noble metal; the method in which the calcination was performed at 1000° C. was adopted as the calcination method; and the amount of phosphorus supported was within a range of approximately 0.03 to 0.3 mol/L-cat although the optimal composition varied depending on the kind of support and the specific surface area. Meanwhile, it was found out that, if a large amount of phosphorus was added as in the catalysts for purification of exhaust gas obtained in Examples 12 and 13, the catalyst performance was significantly lowered, and that such an addition of phosphorus was not preferable.

[Evaluation of Characteristics of Ti-Added Catalysts for Purification of Exhaust Gas Represented by Example 3 and Comparative Example 6]

Catalysts used were catalysts for purification of exhaust gas obtained in Example 3 and Comparative Example 6, and catalysts synthesized by supporting Ti on supports of catalysts obtained in Synthesis Examples 1 to 3 such that the supported amounts per liter of the catalyst were each 0.01, 0.03, 0.05, 0.15, 0.2, 0.25, 0.3, 0.35, and 0.7 mol/L-cat. Characteristic evaluations of the catalysts were each performed.

It was found out that, when a support having a smaller number of basic sites was used as in the catalyst for purification of exhaust gas obtained in Example 3, the amount of $H_2S$ emitted could be sufficiently reduced by making the amount of Ti supported to be approximately 0.1 to 0.3 mol/L-cat. Meanwhile, it was found out that, if a support having a larger number of basic sites was used as in the catalyst for purification of exhaust gas obtained in Comparative Example 6, the effect obtained by adding Ti was small, and the amount of Ti supported needed to be approximately 0.25 to 0.4 mol/L-cat. From such results, it was found out that the amount of Ti supported was preferably within a range of 0.01 to 1.0 mol/L-cat, further preferably within a range of 0.01 to 0.4 mol/L-cat, and particularly preferably within a range of 0.05 to 0.3 mol/L-cat. Note that such a supported amount and a method for supporting Ti are not particularly limited as long as the amount or method allows the basic site content to be 1 mmol/L-cat or less. For example, the method for supporting Ti is not limited to a method in which the solution is allowed to impregnate. A CVD method, a co-precipitation method, or the like can be adopted as appropriate. Moreover, such a solution used for adding Ti is not limited to the aforementioned diluted ethanol solution of titanium (IV) tetrabutoxide monomer. An aqueous or non-aqueous solution of titanium chloride or the like can be used.

Figure 6:
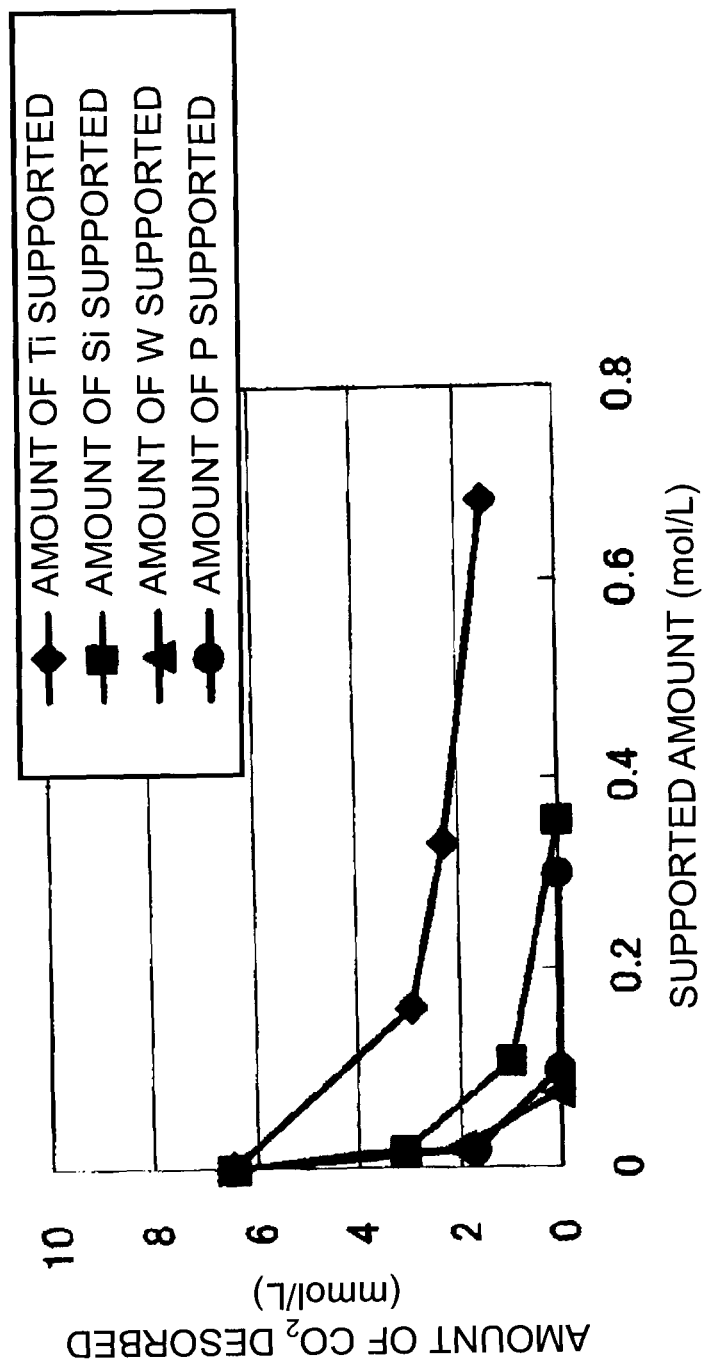
FIG. 6 is a graph showing a relationship between the amount of additive supported and the amount of $CO_2$ desorbed (basic site content) when various additives are supported on a support of Synthesis Example 2 on which Pt and Rh are supported.

Additionally, FIG. 6 shows a relationship between the amount of additive supported and the amount of $CO_2$ desorbed (basic site content) when various additives were supported on a support of Synthesis Example 2 on which Pt and Rh were supported. From the relationship between the amount of additive supported and the amount of $CO_2$ desorbed (basic site content) shown in FIG. 6, it was ascertained that, when the support of Synthesis Example 2 on which Pt and Rh were supported was used, the basic site content could not be reduced sufficiently even with an amount of Ti added of 0.7 mol/L-cat. Furthermore, it was found out that the effect of the additive greatly differed depending on the kind of support and the added element. In addition, when the relationship between the amount of additive supported and the amount of $CO_2$ desobed (basic site content) using other supports was measured, it was found out that the effect of the additive greatly differed depending on the kind of support and the added element, not only in a case of Ti, but also in cases of P, W, Si, Mo, and the like, similarly.

[Evaluation of Characteristics of Catalysts for Purification of Exhaust Gas Obtained in Example 11 and Comparative Example 12]

<Measurement of Amount of $H_{2S}$ Generated after Sulfur-Poisoning Test in Car Using Fuel Containing Sulfur at High Content>

Each of the catalysts for purification of exhaust gas obtained in Example 11 and Comparative Example 12 was installed in the exhaust system of a passenger car equipped with a 2.4-L gasoline engine. The car was driven under a low load condition of approximately 50 km or less. Then, the concentrations of $H_{2S}$ and $SO_2$ emitted from each of the catalysts were measured under a test condition which was controlled so as to be in a high-temperature and rich state. As a result of measuring the concentrations of $H_{2S}$ and $SO_2$ in this manner, it was ascertained that, when the condition was controlled to be in the high-temperature and rich state, the amount of sulfur component emitted from the catalyst for purification of exhaust gas obtained in Example 11 was reduced to approximately one tenth of the amount of sulfur component emitted from catalyst for purification of exhaust gas obtained in Comparative Example 12.

[Evaluation of Characteristics of Catalysts for Purification of Exhaust Gas Obtained in Example 4 and Comparative Example 4]

<Measurement of Amount of $so_2$ Emitted>

Figure 7:
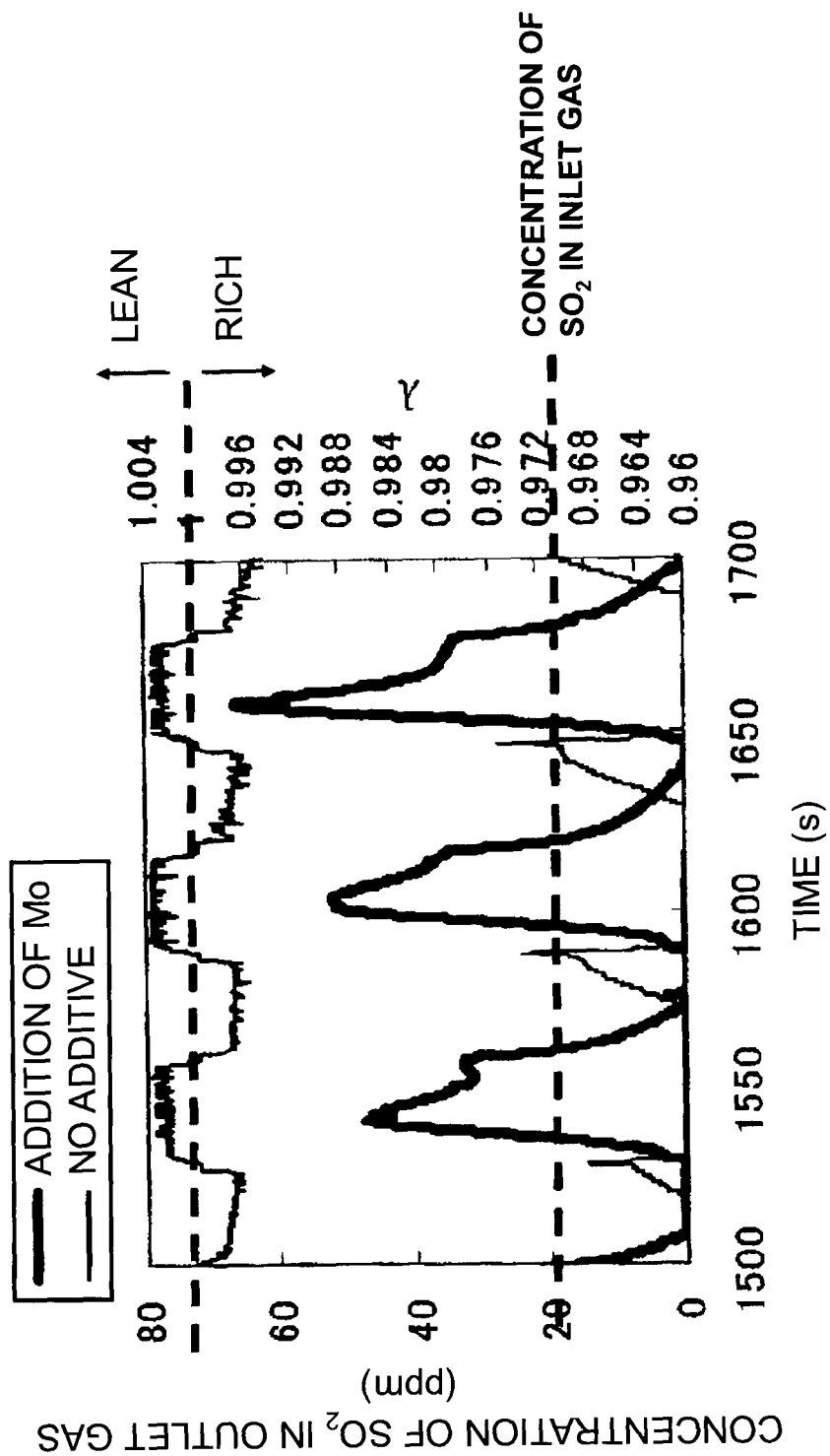
FIG. 7 is a graph showing a relationship between the amount of $SO_2$ emitted and time when the measurement of the amount of $SO_2$ emitted is performed on the catalysts for purification of exhaust gas obtained in Example 4 and Comparative Example 4.

The catalysts for purification of exhaust gas obtained in Example 4 and Comparative Example 4 were used. Each of the catalysts was placed in a reactor exemplified in JP 2002-311013 A. Rich gas containing $H_2$ (0.3% by volume), $O_2$ (0.1% by volume), $H_2O$ (10% by volume), $SO_2$ (20 ppm) and the balance of $N_2$ and lean gas containing $H_2$ (0.2% by volume), $O_2$ (0.15% by volume), $H_2O$ (10% by volume), $SO_2$ (20 ppm) and the balance of $N_2$ were brought into contact with the catalyst at a flow rate of 25 L/min for 10 minutes while alternately changed every 30 seconds. The concentration of $SO_2$ emitted in the outlet gas was measured. FIG. 7 shows the result.

As apparent from the result shown in FIG. 7, it was ascertained that the catalyst for purification of exhaust gas obtained in Comparative Example 4 did not emit $SO_2$ in the oxidation atmosphere but emitted a slight amount of $SO_2$ in the reduction atmosphere. It is speculated that such a result is attributed to both of the facts that part of the sulfur components adhered in the form of sulfate in an oxidation atmosphere is decomposed and emitted in a reduction atmosphere, and that sulfur cannot be adhered in the form of sulfate in a reduction atmosphere due to the shortage of oxygen.

On the other hand, the concentration of $SO_2$ emitted in the outlet gas from the catalyst for purification of exhaust gas of the present invention obtained in Example 4 was lower than 20 ppm, which is the concentration of the supplied gas, in the reduction atmosphere. Meanwhile, in the oxidation atmosphere, the concentration of $SO_2$ emitted was higher than the concentration of the supplied gas. From such a result, it was found out that the catalyst for purification of exhaust gas (Example 4) in which molybdenum was supported trapped a sulfur component (S) in the reduction atmosphere, and released the trapped sulfur component in the form of $SO_2$ in the oxidation atmosphere, thereby being capable of sufficiently suppressing adhesion of the sulfur component.

<Indirect Measurement of Basic Site Content with IR Spectra>

Figure 8:
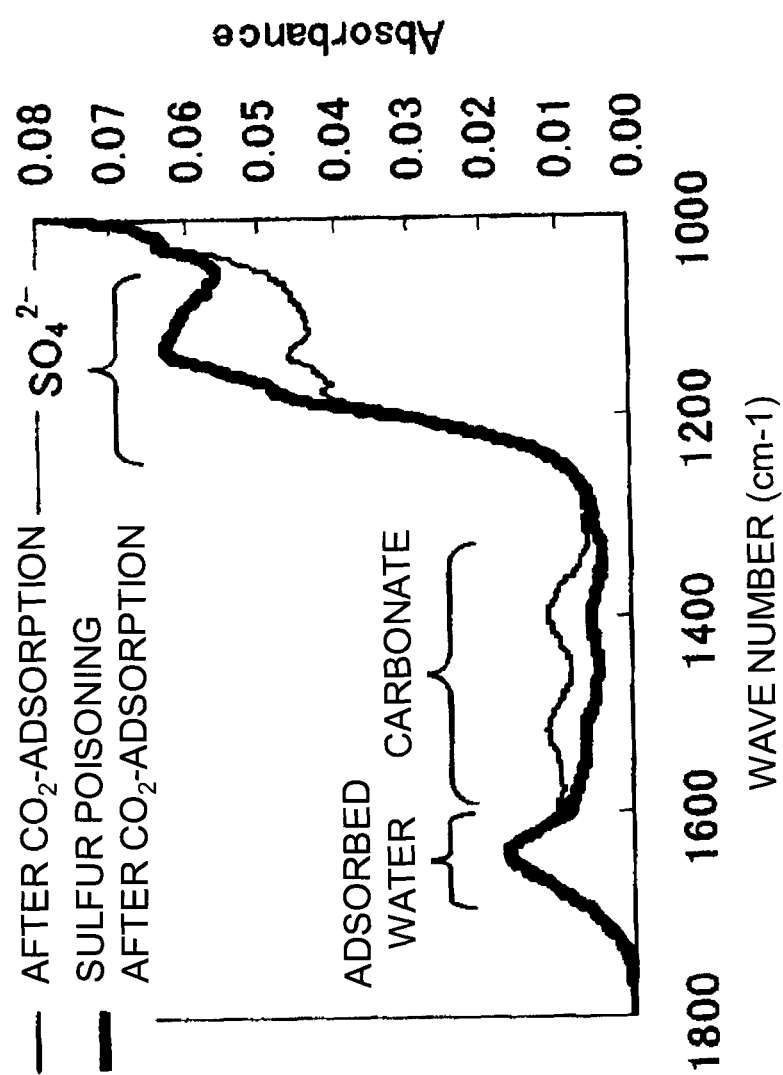
FIG. 8 is a graph of IR spectra of the catalyst for purification of exhaust gas (Comparative Example 4) after the $CO_2$-adsorption treatment and the catalyst for purification of exhaust gas (Comparative Example 4) after a sulfur-poisoning treatment.

The catalyst for purification of exhaust gas obtained in Comparative Example 4 was used to prepare a sample subjected to a $CO_2$-adsorption treatment under conditions as shown in FIG. 1 and a sample subjected to the $CO_2$-adsorption treatment and then a sulfur-poisoning treatment under the conditions shown in FIGS. 2 and 3. The IR spectrum of each of the samples was measured. For such a measurement of IR spectra, a measuring instrument which was manufactured by Thermo-Nicolet Corporation and whose product name was "AVATR360" was used. FIG. 8 shows the obtained result.

As apparent from the IR spectra shown in FIG. 8, it was ascertained that a peak of carbonate observed after the $CO_2$-adsorption treatment was decreased due to the sulfur-poisoning treatment, whereas a peak of $SO_4^{2-}$ (sulfate) was increased instead. Such a result shows that the basic site is an adhesion site of sulfate. Note that a tiny peak of $SO_4^{2-}$ (sulfate) seen after the $CO_2$ adsorption is presumably derived from sulfur contained in alumina powders which are a raw-material.

Moreover, as apparent from the result shown in FIG. 7 and FIG. 8 as well as the fact that the basic site contents of the catalysts for purification of exhaust gas obtained in Example 4 and Comparative Example 4 were 0.38 mmol/L-cat (Example 4) and 2.07 mmol/L-cat (Comparative Example 4), respectively, it was ascertained that, by supporting molybdenum, the content of sites where sulfur components were adhered in the oxidation atmosphere could be reduced. From such a result, it is speculated that, by supporting molybdenum that is an element having an electronegativity higher than that of a cation of the metal element (aluminium) in the metal oxide support, sulfur poisoning of the catalyst is suppressed in an oxidation atmosphere.

[Evaluation of Characteristics of Catalysts for Purification of Exhaust Gas Obtained in Example 7 and Comparative Example 9]

Figure 9:
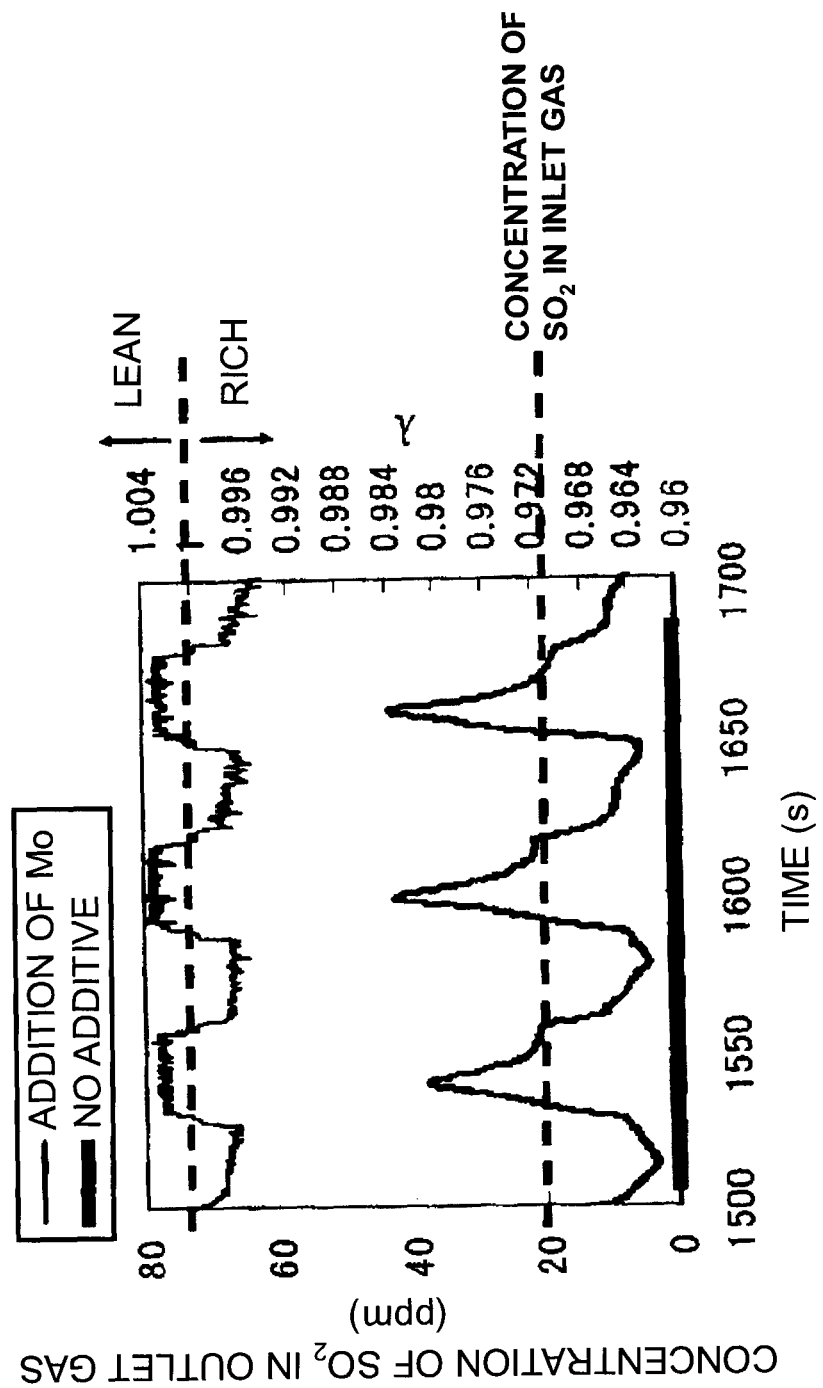
FIG. 9 is a graph showing a relationship between the amount of $SO_2$ emitted and time when the measurement of the amount of $SO_2$ emitted is performed on the catalysts for purification of exhaust gas obtained in Example 7 and Comparative Example 9.

Characteristic evaluation was performed on the catalysts for purification of exhaust gas obtained in Example 7 and Comparative Example 9 by adopting the same method as that of measuring the amount of $SO_2$ emitted performed on the catalysts for purification of exhaust gas obtained in Example 4 and Comparative Example 4. FIG. 9 shows the result of such a measurement.

As apparent from the result shown in FIG. 9, it was ascertained that the catalyst for purification of exhaust gas obtained in Comparative Example 9 did not emit $SO_2$. Meanwhile, it was ascertained that the concentration of $SO_2$ emitted in the outlet gas from the catalyst for purification of exhaust gas of Example 7 was lower than 20 ppm, which was the concentration of the supplied gas, in the reduction atmosphere, but higher than the concentration of the supplied gas in the oxidation atmosphere. From such a result, it was found out that the catalyst for purification of exhaust gas (Example 7) in which molybdenum was supported trapped a sulfur component in the reduction atmosphere, and released the trapped sulfur component in the form of $SO_2$ in the oxidation atmosphere, thereby being capable of suppressing adhesion of a sulfur component. From such a result, it was ascertained that, by supporting molybdenum that is an element having an electronegativity higher than that of a cation of the metal element (cerium or zirconia) of the metal oxide support, the adhesion sites of sulfur components could be reduced.

[Characteristic Evaluation of Catalysts for purification of exhaust gas obtained in Examples 15 to 19 and Comparative Examples 14 to 17]

<Measurement of 50% Purification Temperature>

First, each of the catalysts for purification of exhaust gas obtained in Examples 15 to 19 and Comparative Examples 14 to 17 was placed in a reactor exemplified in JP 2002-311013 A. A temperature-programmed test was performed in a stoichiometric variable gas atmosphere containing HC (0.023% by volume), CO+$H_2$ (0.05% by volume), $NO_x$ (0.01% by volume), $CO_2$ (10% by volume), $H_2O$ (9.9% by volume), $O_2$ and $N_2$ at a flow rate of 25 L/min. Thus, the 50% purification temperatures of the HC, CO, and $NO_x$ were measured.

<Measurement of Amount of $H_2S$ Desorbed>

Figure 10:
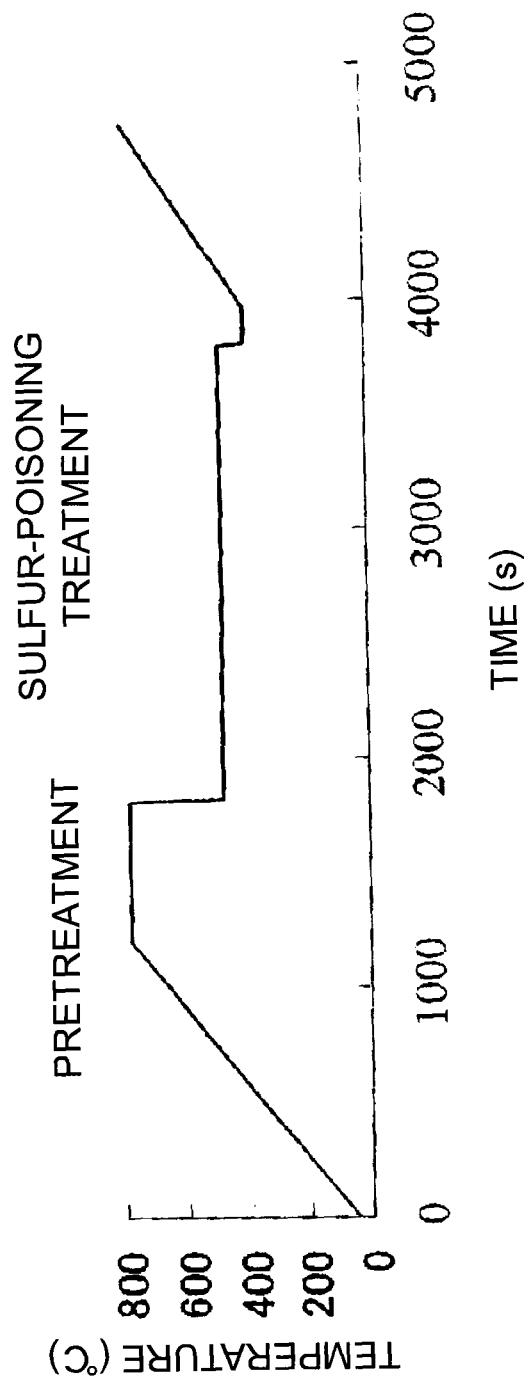
FIG. 10 is a graph showing a relationship between the temperature of inlet gas and time in measuring the amounts of $H_{2S}$ emitted of the catalysts for purification of exhaust gas obtained in Example 7 and Comparative Example 9.
Figure 11:
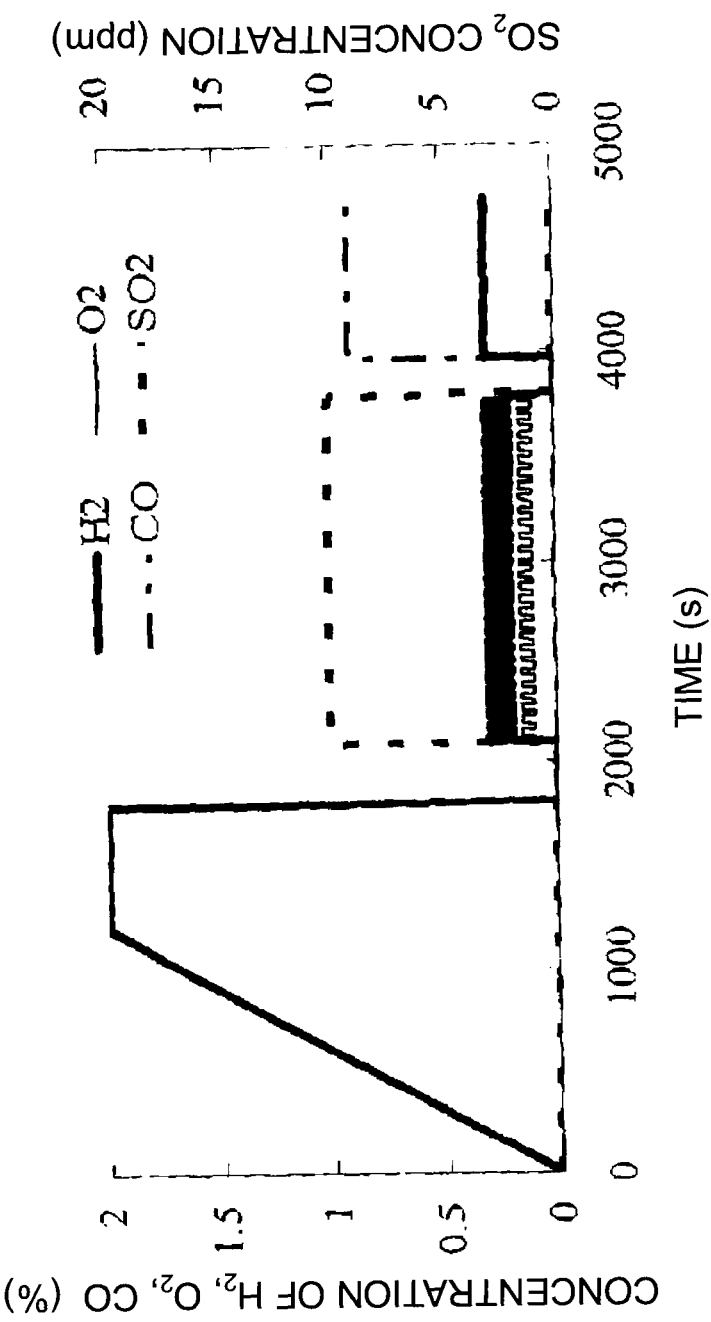
FIG. 11 is a graph showing a relationship between the concentration of each component in the inlet gas and time in measuring the amounts of $H_{2S}$ emitted of the catalysts for purification of exhaust gas obtained in Example 7 and Comparative Example 9.

The amounts of $H_2S$ emitted from the catalysts for purification of exhaust gas obtained in Examples 15 to 19 and Comparative Examples 14 to 17 were measured by adopting the same method as that of measuring an amount of $H_2S$ desorbed performed on the catalysts for purification of exhaust gas obtained in Examples 1 to 5 and Comparative Examples 1 to 4 except that the measurement was performed under conditions shown in FIG. 10 depicting a graph showing a relationship between the temperature of inlet gas and time, and at concentrations shown in FIG. 11 depicting a graph showing a relationship between the concentration of the inlet gas and time.

Figure 12:
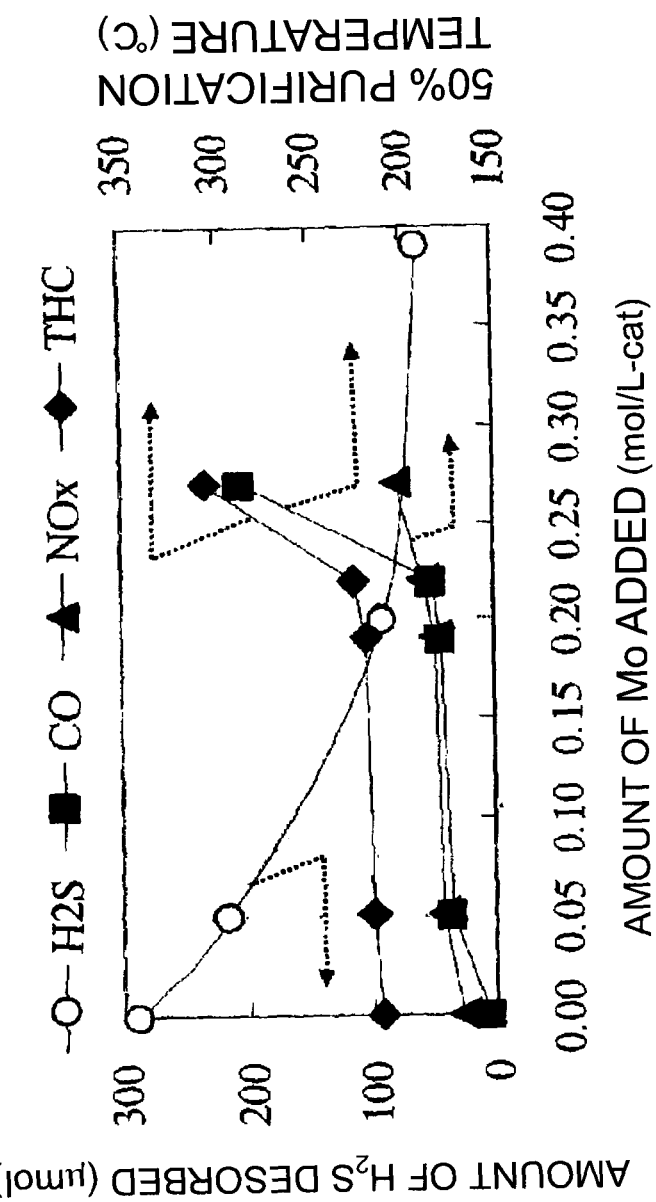
FIG. 12 is a graph showing a relationship between the amount of molybdenum supported and the 50% purification temperature of CO, NO, and THC of catalysts for purification of exhaust gas obtained in Examples 15 to 19 and Comparative Examples 14 to 17 as well as a relationship between the amount of molybdenum supported and the amount of $H_{2S}$ emitted of the catalysts for purification of exhaust gas obtained in Examples 15 to 19 and Comparative Examples 14 to 17.

FIG. 12 shows the measurement results of the 50% purification temperature and the amount of $H_2S$ desorbed with respect to the amount of molybdenum added in each of the catalysts for purification of exhaust gas obtained in Examples 15 to 19 and Comparative Examples 14 to 17 thus measured. As apparent from FIG. 12, it was ascertained that, when the amount of molybdenum supported was 0.05 to 0.22 mol/L-cat, both the three-way catalytic activity and the reduction in the amount of $H_2S$ emitted were achieved at a higher level.

Comparative Examples 18 to 20

Catalysts of Comparative Examples 20 to 22 were prepared by adopting the same method as that in Synthesis Example 1 except that support powders shown below were used in place of θ-alumina (specific surface area of approximately 100 $m^2/g$).

<Support Powders>

Comparative Example 18: lanthanum-stabilized activated alumina powders (specific surface area of approximately 150 $M^2/g$), having a supported amount of 100 g/L-cat Comparative Example 19: alumina-ceria-zirconia composite oxide (ACZ: specific surface area of approximately 80 $m^2/g$), having a supported amount of 100 g/L-cat Comparative Example 20: zirconia (no added element: specific surface area of approximately 100 $m^2/g$), having a supported amount of 100 g/L-cat

[Characteristic Evaluation of Catalysts Obtained in Comparative Example 4, Comparative Example 9 and Comparative Examples 18 to 20]

The basic site contents and the amounts of $H_2S$ emitted of the catalysts obtained in Comparative Example 4, Comparative Example 9 and Comparative Examples 18 to 20 were measured by adopting the same methods as those adopted in the characteristic evaluation of the catalysts for purification of exhaust gas obtained in Examples 1 to 5 and Comparative Examples 1 to 4. Table 8 shows the result.

TABLE 8

|  | Presence/absence of additive member, and support | Basic site content mmol/ L-cat | Amount of $H_2S$ emitteed mmol/ L-cat |
| --- | --- | --- | --- |
| Comparative Example 4 | No addition (θ-alumina) | 2.07 | 3.83 |
| Comparative Example 9 | No addition (CZ) | 2.47 | 6.94 |
| Comparative Example 18 | No addition (lanthanum-stabilized activated alumina) | 5.12 | 6.53 |
| Comparative Example 19 | No addition (ACZ) | 4.05 | 9.23 |
| Comparative Example 20 | No addition (zirconia) | 5.01 | 9.08 |

From the results of the characteristic evaluation of the catalysts for purification of exhaust gas shown in Table 8, it can be seen that, in order to have a basic site content of 1 mmol/L-cat or less, the catalyst obtained in Comparative Example 4 or 9 needs to have a basic site content smaller than ½ of the value; the catalysts obtained in Comparative Examples 18 and/or 20 need to have a basic site content smaller than ⅕ of the value; and the catalyst obtained in Comparative Example 19 needs to have a basic site content smaller than ¼ of the value. Moreover, the catalysts obtained in Comparative Example 4, Comparative Example 9 and Comparative Examples 18 to 20 are each a catalyst generally used as a catalyst for purification of exhaust gas. Furthermore, the coating amount of support powders in a normally-used catalyst (Comparative Example 4, Comparative Example 9, Comparative Examples 18 to 20, or the like) is approximately 100 to 200 g/L-cat, and the coat layer of the catalyst often includes lanthanum-stabilized activated alumina or a CZ material. Accordingly, it was found out that the range of the basic site contents which the catalyst for purification of exhaust gas of the present invention had was within significantly narrow values in comparison with generally-used catalysts.

Moreover, the basic site contents of the catalysts obtained in Comparative Example 4, Comparative Example 9 and Comparative Examples 18 to 20 were measured to allow the relative comparison between the basic site contents of the generally-used catalysts and the basic site content of the catalyst for purification of exhaust gas of the present invention. The basic site content of the catalyst for purification of exhaust gas of the present invention is, as described above, 1 mmol/L-cat or less, preferably 0.8 mmol/L-cat or less, more preferably 0.5 mmol/L-cat or less, and particularly preferably 0.3 mmol/L-cat or less. Thus, as to the catalysts obtained in Comparative Examples 4 and 9, the basic site content is preferably approximately 1/2.4 or less, more preferably approximately 1/4 or less, and particularly preferably approximately 1/6 or less. Moreover, as to the catalysts obtained in Comparative Examples 18 and 20, the basic site content is preferably approximately 1/6 or less, more preferably approximately 1/10 or less, and particularly preferably approximately 1/15 or less. Furthermore, as to the catalyst obtained in Comparative Example 19, the basic site content is preferably approximately 1/5 or less, more preferably approximately 1/8 or less, and particularly preferably approximately 1/12 or less.

However, in order to exhibit a good balance of the stabilization of the noble metal, heat resistance and catalyst performance in a higher levels, it is preferable to leave the basic site content by a slight amount. Additionally, such a basic site content greatly varies depending on the kind of a support, a specific surface area, and an additive material. Thus, in the present invention, the basic site content needs to be within the above-described numerical range (1 mmol/L-cat or less) when the catalyst is a fresh catalyst (which may include one that has been used for 1000-km driving, and preferably less than 100-km driving or so) that has a foremost concern for generation of $H_2S$ under a condition where a fuel containing sulfur at a high content is used. In other words, anticipated is a case where even a normal catalyst has a basic site content within the numerical range of the basic site content of the catalyst for purification of exhaust gas of the present invention after deterioration or sulfur poisoning of the normal catalyst due to long-distance driving. For this reason, the basic site content of the catalyst for purification of exhaust gas of the present invention is determined on the basis of the basic site content of a fresh catalyst (which may include one that has been used for 1000-km driving, and preferably less than 100-km driving or so) that has a foremost concern for generation of $H_2S$.

INDUSTRIAL APPLICABILITY

As described so far, according to the present invention, it is possible to provide a catalyst for purification of exhaust gas capable of sufficiently reducing the amount of $H_2S$ emitted not only under normal operation conditions but also under high load conditions while exhibiting a sufficiently high catalytic activity as a three-way catalyst; and an apparatus and a method for purification of exhaust gas using the catalyst.

Accordingly, the catalyst for purification of exhaust gas of the present invention shows an excellent effect of reducing the amount of $H_2S$ emitted, and is particularly useful as a catalyst for purification of exhaust gas emitted from internal combustion engines of automobiles.

The invention claimed is:

1. A catalyst for purification of exhaust gas, in which a noble metal is supported on a metal oxide support, wherein
   at least one element selected from the group consisting of phosphorus, molybdenum, tungsten, titanium, iron and silicon is further supported on the metal oxide support, and
   a basic site content of the catalyst for purification of exhaust gas is 1 mmol/L-cat or less, as determined on the basis of an amount of $CO_2$ desorbed per liter of the catalyst as measured by a $CO_2$ temperature-programmed desorption method.

2. The catalyst for purification of exhaust gas according to claim 1, wherein
   the basic site content of the catalyst for purification of exhaust gas is 0.5 mmol/L-cat or less.

3. The catalyst for purification of exhaust gas according to claim 1, wherein an amount of each element supported per liter of the catalyst is 0.01 to 1.0 mol/L-cat.

4. The catalyst for purification of exhaust gas according to claim 1, wherein an amount of each element supported per liter of the catalyst is 0.03 to 0.3 mol/L-cat.

5. The catalyst for purification of exhaust gas according to claim 1, wherein an amount of each element supported per liter of the catalyst is 0.05 to 0.22 mol/L-cat.

6. The catalyst for purification of exhaust gas according to claim 1, wherein a specific surface area of the metal oxide support is 3 to 200 $m^2/g$.

7. The catalyst for purification of exhaust gas according to claim 1, wherein an amount of the noble metal supported per liter of the catalyst is 0.1 to 10 g/L-cat.

8. The catalyst for purification of exhaust gas according to claim 1, wherein
   the metal oxide support is formed from at least one metal oxide selected from the group consisting of activated alumina, alumina-ceria-zirconia and ceria-zirconia.

9. An apparatus for purification of exhaust gas, comprising:
   the catalyst for purification of exhaust gas according to claim 1.

10. A method for purification of exhaust gas, wherein
    exhaust gas is brought into contact with the catalyst for purification of exhaust gas according to claim 1 to purify the exhaust gas.

* * * * *